United States Patent
Shimizu et al.

[11] Patent Number: 5,951,913
[45] Date of Patent: Sep. 14, 1999

[54] LIQUID CRYSTAL COMPOSITIONS COMPRISING SILACYCLOHEXANE COMPOUNDS

[75] Inventors: Takaaki Shimizu; Tsutomu Ogihara; Tatsushi Kaneko; Kenji Koizumi; Mutsuo Nakashima, all of Niigata-ken, Japan

[73] Assignee: Shin-Etsu Chemical Co., Ltd., Tokyo, Japan

[21] Appl. No.: 08/856,710

[22] Filed: May 15, 1997

[30] Foreign Application Priority Data

May 22, 1996 [JP] Japan .................................. 8-126893

[51] Int. Cl.$^6$ .......................... C09K 19/34; C09K 19/12
[52] U.S. Cl. ................................ 252/299.61; 252/299.66
[58] Field of Search ......................... 252/299.61, 299.66

[56] References Cited

U.S. PATENT DOCUMENTS

| | | | |
|---|---|---|---|
| 5,454,977 | 10/1995 | Shimizu et al. | 252/299.61 |
| 5,496,501 | 3/1996 | Shimizu et al. | 252/299.61 |
| 5,527,490 | 6/1996 | Kinsho et al. | 252/299.61 |
| 5,547,606 | 8/1996 | Kinsho et al. | 252/299.61 |
| 5,573,705 | 11/1996 | Kaneko et al. | 252/299.61 |
| 5,578,244 | 11/1996 | Shimizu et al. | 252/299.61 |
| 5,582,764 | 12/1996 | Nakashima et al. | 252/299.61 |
| 5,665,271 | 9/1997 | Ogihara et al. | 252/299.61 |
| 5,679,746 | 10/1997 | Shimizu et al. | 252/299.61 |

FOREIGN PATENT DOCUMENTS

| | | |
|---|---|---|
| 0630903 | 12/1994 | European Pat. Off. |
| 0665232 | 8/1995 | European Pat. Off. |
| 0718301 | 6/1996 | European Pat. Off. |
| 0742222 | 11/1996 | European Pat. Off. |

*Primary Examiner*—C. H. Kelly
*Attorney, Agent, or Firm*—McAulay Nissen Goldberg Kiel & Hand, LLP

[57] ABSTRACT

A liquid crystal composition having a liquid crystal component with a chemical structure of two saturated rings connected directly to one another, and an additional structural isomer thereof having a silane atom in a different position from the first component and having the structure set forth in formula (1) hereinbelow.

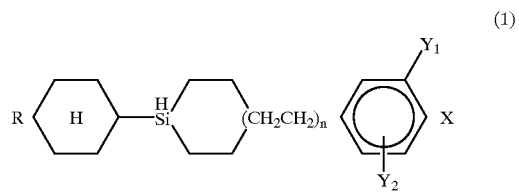

(1)

This composition provides an improved effect with respect to enhancement in both response speed and $T_{NI}$ (nematic-isotropic transition temperature) as a high voltage hold ratio as required for TFT driving in addition to also lowering the voltage.

24 Claims, No Drawings

LIQUID CRYSTAL COMPOSITIONS COMPRISING SILACYCLOHEXANE COMPOUNDS

BACKGROUND OF THE INVENTION

1. Field of the Invention

This invention relates to liquid crystal compositions comprising compounds having a silacyclohexane ring, which a cyclohexyl group with a substituent is substituted on silane, and liquid crystal display elements containing the same.

2. Description of the Related Art

Liquid crystal display elements are elements utilizing the optical anisotropy and dielectric anisotropy possessed by liquid crystal materials. According to the display mode, there are various types including the TN (twisted nematic), STN (super-twisted nematic), SBE (super-twisted birefringent effect), DS (dynamic scattering), guest-host, DAP (distortion of aligned phase) and OMI (optical mode interference) types. The most common display devices are ones having a twisted nematic structure on the basis of the Schutt-Hellfritt effect.

Although the properties required for the liquid crystal materials used in these liquid crystal display elements more or less vary according to the display mode, a wide liquid crystal temperature range and stability to moisture, air, light, heat and electric fields are commonly required for all display modes. Moreover, it is desired that the liquid crystal materials have low viscosity and provide a short addressing time, a low threshold voltage and high contrast in the cells. At present, there is no single compound that meets all of these requirements, and it is a matter of fact that liquid crystal mixtures obtained by mixing several or several tens of liquid crystal compounds and/or latent liquid crystal compounds are being used. Accordingly, it is also important that these components are easily miscible with each other.

Among the various display modes, the active matrix (AM)-driven twisted nematic (TN) mode using a thin film transistor (TFT) element array or metal insulator metal (MIM) element array is being extensively employed owing to its high image display quality (i.e., high fineness, high contrast and high response speed). In this back ground, DRAM manufacturing technology in the industrial field of silicone semiconductor has been applied for liquid crystal manufacturing technology, resulting in acceleration of saving cost and technological progress.

In addition to the above-required properties, a nematic liquid crystal material used for the active matrix liquid crystal display (AM-LCD) is further required to have what is called a signal voltage holding property from reasons characteristic of this driving method. This signal voltage holding property designates the degree of drop of the signal voltage applied to TFT picture elements containing a liquid crystal material, within a given frame period. Accordingly, when the signal voltage does not drop (i.e., when the voltage holding ratio is 100%), the alignment of the liquid crystal molecules is not broken and, therefore, no reduction in contrast is caused. Moreover, this voltage holding property is affected by the environment in which the liquid crystal panel is used, so that the lifetime of the property tends to be shortened in an environment exposed to high-intensity light as in liquid crystal panels for projection use, and in an environment exposed to high temperatures as in liquid crystal panels for use on automobiles.

From these points of view we have had a patent application relating to the liquid crystal composition having a low driving voltage and high voltage holding rate for use of an AM drive because dielectric constant anisotropy has a positive value and a molecular structure of a component molecular contains a silacyclohexane ring (Japanese Patent Application Nos. 6-336184/1994 and 6-336185/1994).

It has been desired to lower the driving voltages of liquid crystal materials because the driving voltages of driver ICs have been lowered in the liquid crystal module. The liquid crystal compound having a silacyclohexane ring in a molecular structure is an extremely effective component for use by low-voltage driving as shown in aforementioned application. One of the important main components for the composition of aforementioned application is shown below:

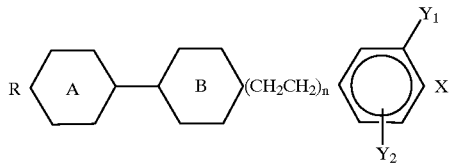

wherein

R is an alkyl group of 1 to 7 carbon atoms, alkoxyalkyl group of 2 to 7 carbon atoms, a mono- or difluoroalkyl group of 2 to 7 carbon atoms, or alkenyl group of 2 to 7 carbon atoms, n is 0 or 1, one of

and

is a trans-1-sila-1,4-cyclohexylene group or trans-4-sila-1,4-cyclohexylene group, while the other is trans-1,4-cyclohexylene group, X is H, F, Cl, $OCHF_2$, $OCF_3$, $CF_3$, $OC_kH_{2k+1}$ or $C_kH_{2k+1}$ {wherein k is an integer in the range of 1 to 5}, $(O)_sC_pH_qF_r$ {wherein s is 0 or 1, p is 2, 3 or 4, q and r are each 0 or a positive integer, and (q+r)=(2p+1)}, $(O)_sCY=CX_1X_2$ {wherein $X_1$ and Y are each H, F or Cl, and $X_2$ is F or Cl}, $Y_1$ and $Y_2$ are each H or F.

As one of the examples for the above ring structure in the aforementioned application, using the compound

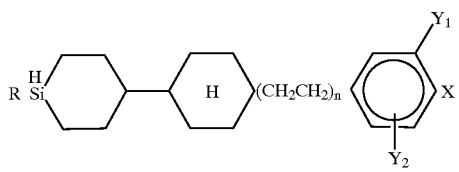

lowering voltage has been achieved.

A liquid crystal compound containing a silacyclohexane compound is a useful component for lowering voltage in comparison with the conventional hydrocarbon liquid crystal compounds. However, it has disadvantage of being slower in response speed and lower in $T_{NI}$ (nematic-isotropic transition temperature) than the conventional liquid crystal compounds.

SUMMARY OF THE INVENTION

Following the further keen study, we have found that further improvement of the properties is achieved by adding the structural isomer below having a silane atom on a different position as one of the components.

(1)
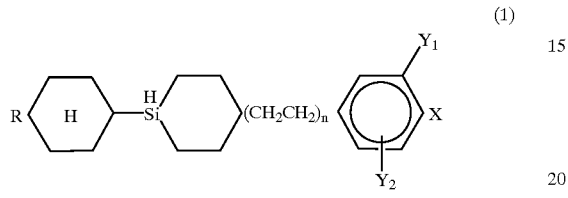

That is, according to the present invention, relating to a liquid crystal component having a chemical structure of two saturated rings connected directly each other, an addition of a liquid crystal compound having a silane atom in an optimized position in a molecular structure into a liquid crystal composition as a component brings in a preferable effect of enhancement in both response speed and $T_{NI}$ (nematic-isotropic transition temperature) in addition to further achievement of lowering the voltage.

It is needless to say it has a high voltage holding rate required for the TFT driving.

The present invention provides liquid crystal compositions comprising two or more compounds of the general formula (1)

(1)
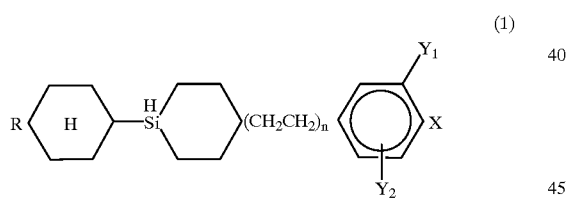

wherein
R is an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 carbon atoms;

n is 0 or 1;

steric configurations of a silacyclohexylane ring and a cyclohexane ring are both in trans form;

X is H, F, Cl, $OCHF_2$, $OCF_3$, $CF_3$, $OC_kH_{2k+1}$ or $C_kH_{2k+1}$ {wherein k is an integer in the range of 1 to 5}, $(O)_sC_pH_qF_r$ {wherein s is 0 or 1, p is 2, 3 or 4, q and r are each 0 or a positive integer and (q+r)=(2p+1)}, or $(O)_sCY=CX_1X_2$ {wherein s is 0 or 1, $X_1$ and Y are each H, F or Cl, and $X_2$ is F or Cl};

$Y_1$ and $Y_2$ are each H or F.

The present invention also provides liquid crystal compositions comprising two or more compounds of the general formula (1) and one or more compounds selected from the group consisting of the general formulae (2) to (13)

(2)
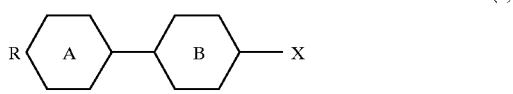

(3)
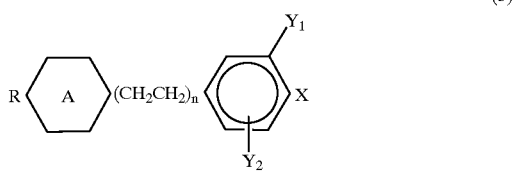

(4)
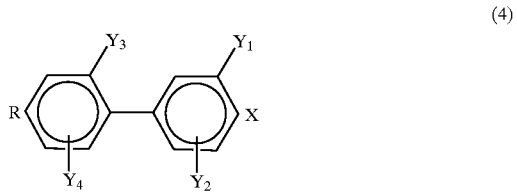

(5)
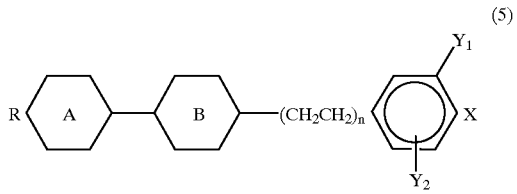

(6)
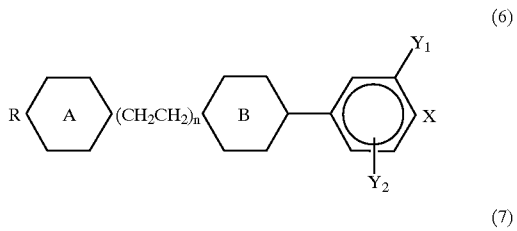

(7)
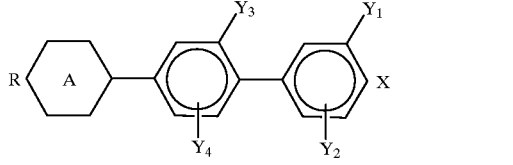

(8)
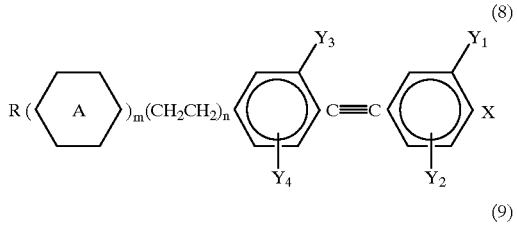

(9)
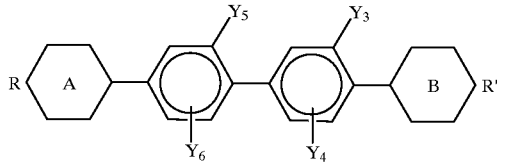

(10)
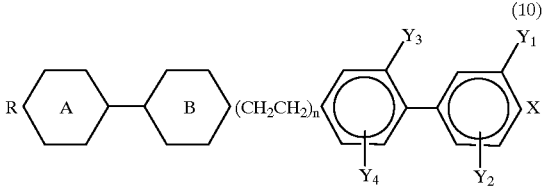

-continued

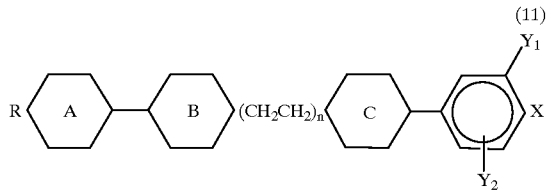
(11)

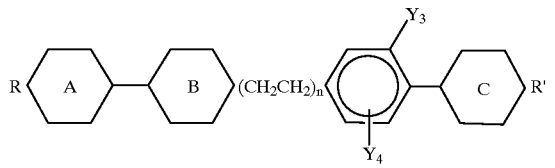
(12)

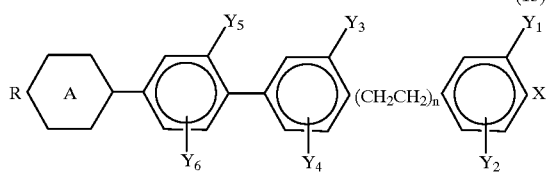
(13)

wherein

R and R' are each an alkyl group of 1 to 7 carbon atoms, an alkoxyalkyl group of 2 to 7 carbon atoms, a mono- or difluoroalkyl group of 2 to 7 carbons, or an alkenyl group of 2 to 7 carbons;

m is 0 or 1;

n is 0 or 1;

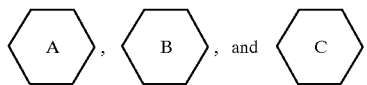

are each a trans-1-sila-1,4-cyclohexylene, trans-4-sila-1,4-cyclohexylene or trans-1,4-cyclohexylene group;

X is H, F, Cl, $OCHF_2$, $OCF_3$, $CF_3$, $OC_kH_{2k+1}$ or $C_kH_{2k+1}$ {wherein k is an integer in the range of 1 to 5}, $(O)_sC_pH_qF_r$ {wherein s is 0 or 1, p is 2, 3 or 4, q and r are each 0 or a positive integer, and (q+r)=(2p+1)}, or $(O)_sCY=CX_1X_2$ {wherein s is 0 or 1, $X_1$ and Y are each H, F or Cl, and $X_2$ is F or Cl};

$Y_1$, $Y_2$, $Y_3$, $Y_4$, are each H or F.

The present invention also provides the liquid crystal display elements comprising these liquid crystal compositions.

DETAILED DESCRIPTION OF PREFERRED EMBODIMENTS

Specific chemical structures represented by the general formula (1) are as follows:

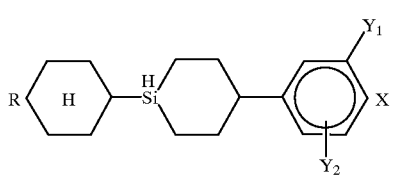
(1a)

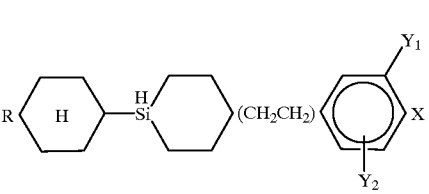
(1b)

According to the present invention, liquid crystal compositions comprise two or more compounds of the general formula (1). The compounds may be of only the general formula (1a), or only the general formula (1b), or a mixture of compounds of both general formulae (1a) and (1b).

R in the general formula (1) includes any of the following groups:

(a) Alkyl groups of 1 to 7 carbon atoms, including methyl, ethyl, n-propyl, n-butyl, n-pentyl, n-hexyl and n-heptyl.

(b) Alkoxyalkyl groups of 2 to 7 carbon atoms, including methoxymethyl, 2-methoxyethyl, 3-methoxypropyl, 4-methoxybutyl, 5-methoxypentyl, 6-methoxyhexyl, ethoxymethyl, 2-ethoxyethyl, 3-ethoxypropyl, 4-ethoxybutyl, 5-ethoxypentyl, (n-propoxy)methyl, 2-(n-propoxy)ethyl, 3-(n-propoxy)propyl, 4-(n-propoxy)butyl, (n-butoxy)methyl, 2-(n-butoxy)ethyl, 3-(n-butoxy)propyl, (n-pentoxy)methyl, 2-(n-pentoxy)ethyl and (n-hexyloxy)methyl.

(c) Mono- and difluoroalkyl groups of 2 to 7 carbon atoms, including 1-fluoroethyl, 1-fluoropropyl, 1-fluorobutyl, 1-fluoropentyl, 1-fluorohexyl, 1-fluoroheptyl, 2-fluoroethyl, 2-fluoropropyl, 2-fluorobutyl, 2-fluoropentyl, 2-fluorohexyl, 2-fluoroheptyl, 3-fluoropropyl, 3-fluorobutyl, 3-fluoropentyl, 3-fluorohexyl, 3-fluoroheptyl, 4-fluorobutyl, 4-fluoropentyl, 4-fluorohexyl, 4-fluoroheptyl, 5-fluoropentyl, 5-fluorohexyl, 5-fluoroheptyl, 6-fluorohexyl, 6-fluoroheptyl, 7-fluoroheptyl, 1,1-difluoroethyl, 1,1-difluoropropyl, 1,1-difluorobutyl, 1,1-difluoropentyl, 2,2-difluoroethyl, 2,2-difluoropropyl, 2,2-difluorobutyl, 2,2-difluoropentyl, 3,3-difluoropropyl, 3,3-difluorobutyl, 3,3-difluoropentyl, 4,4-difluorobutyl, 4,4-difluoropentyl and 5,5-difluoropentyl.

(d) Alkenyl groups of 2 to 7 carbon atoms, including vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4E-hexenyl, 4Z-hexenyl, 4E-heptenyl, 4Z-heptenyl, 5-hexenyl, 5E-heptenyl, 5Z-heptenyl and 6-heptenyl.

In the general formula (I), X is H, F, Cl, $OCHF_2$, $OCF_3$, $CF_3$, $OC_kH_{2k+1}$ (wherein k is 1, 2, 3, 4, or 5), $C_kH_{2k+1}$ (wherein k is 1, 2, 3, 4, or 5), $(O)_sC_pH_qF_r$ {wherein s is 0 or 1, p is 2, 3 or 4, q and r are each 0 or a positive integer and (q+r)=(2p+1)}, $(O)_sCY=CX_1X_2$ (wherein s is 0 or 1, $X_1$ and Y are each H, F or Cl, and $X_2$ is F or Cl).

Specific examples of $(O)_sC_pH_qF_r$ are as follows: $CH_2CH_2F$, $CH_2CHF_2$, $CH_2CF_3$, $CH_2CH_2CF_3$, $CF_2CH(F)CF_3$, $OCH_2CH_2F$, $OCH_2CHF_2$, $OCH_2CF_3$, $OCH_2CH_2CHF_2$, $OCH_2CH_2CF_3$, $OCH_2CF_2CHF_2$, $OCH_2CF_2CF_3$, $OCF_2CH(F)CF_3$ and $OCF_2CF_3$.

Specific examples of $(O)_sCY=CX_1X_2$ are as follows: —CH=$CF_2$, —OCH=$CF_2$, —CF=CFH, —OCF=CFH, —CF=$CF_2$, —OCF=$CF_2$, —CF=CHCl, —CF=$CCl_2$, —CCl=CHCl and —CH=$CCl_2$.

In the general formula (1), the steric configurations of the silacylohexane ring and the cyclohexane ring are both in trans form.

In the general formula (1), specific examples of the partial skeleton structure (PS-1)

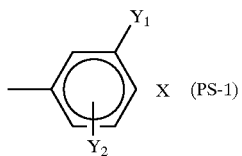

are as follows:

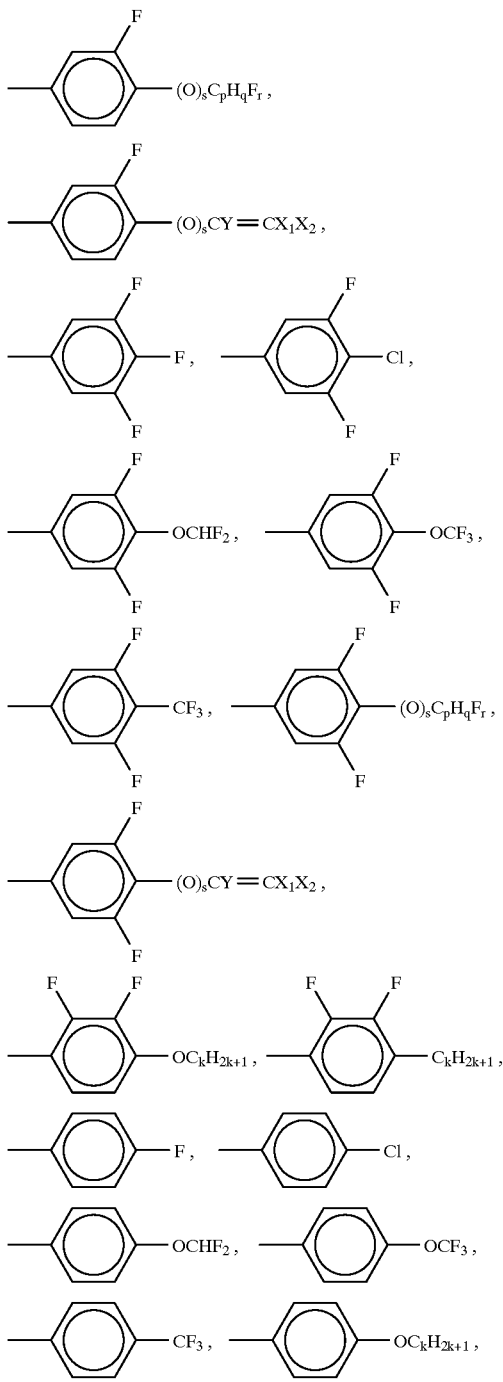

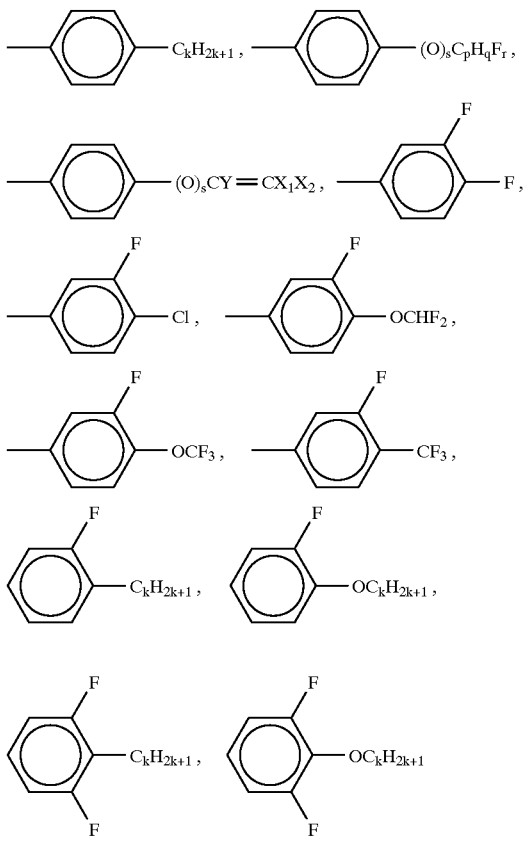

Preferred examples of R in the general formula (1) are as follows:

(a') Alkyl groups of 2 to 7 carbon atoms, including ethyl, n-propyl, n-butyl, n-pentyl, n-hexyl and n-heptyl.

(b') Alkoxyalkyl groups of 2 to 7 carbon atoms, including methoxymethyl, 2-methoxyethyl, 3-methoxypropyl, 5-methoxypentyl, ethoxymethyl, 2-ethoxyethyl, (n-propoxy)methyl and (n-pentoxy)methyl.

(c') Mono- and difluoroalkyl groups of 2 to 7 carbon atoms, including 2-fluoroethyl, 2-fluoropropyl, 4-fluorobutyl, 4-fluoropentyl, 5-fluoropentyl, 6-fluorohexyl, 7-fluoroheptyl, 1,1-difluoroethyl, 2,2-difluoroethyl, 2,2-difluoropropyl, 2,2-difluorobutyl, 4,4-difluorobutyl and 4,4-difluoropentyl.

(d') Alkenyl groups of 2 to 7 carbon atoms, including vinyl, 1E-propenyl, 1E-butenyl, 1E-pentenyl, 1E-hexenyl, 1E-heptenyl, 3-butenyl, 3E-pentenyl, 3E-hexenyl, 3E-heptenyl, 4-pentenyl, 4E-hexenyl, 4Z-hexenyl, 4E-heptenyl, 4Z-heptenyl, 5-hexenyl and 6-heptenyl.

Preferred specific examples of $(O)_sC_pH_qF_r$ and $(O)_sCY=CX_1X_2$ are as follows: $OCH_2CHF_2$, $OCF_2CH(F)CF_3$, $CH_2CHF_2$, or $-CH=CF_2$.

Preferred examples of the partial skeleton structure (PS-1) are as follows:

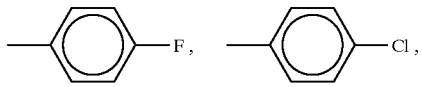

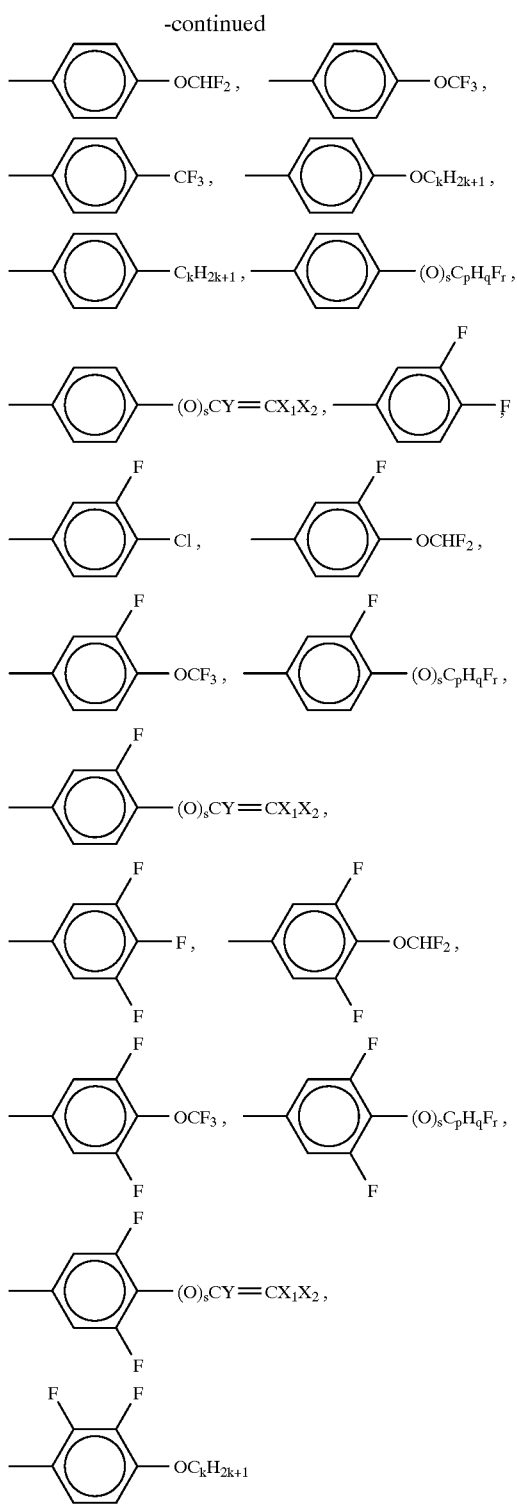

According to the present invention, the compositions consisting of compounds of the general formula (1) alone yield liquid crystal properties. In this case, however, it is necessary to select and combine two or more compounds of the general formula (1). One or more compounds other than the compounds of the general formula (1) may be added to two or more compounds of the general formula (1) to form a liquid crystal composition of the present invention.

According to the present invention, liquid crystal compositions comprise two or more compound of the general formula (1) and one or more compounds selected from compounds of the general formulae (2) to (13). That is, one or more compounds of the general formulae (2) to (13) are preferably added into two or more compounds of the general formula (1) to form a liquid crystal composition.

In the general formulae (2)–(13), R and X are as defined for the general formula (1), and R' is as defined for R. Specific examples of the partial skeleton structure (PS-1) are same as those for the general formula (1).

$Y_1$, $Y_2$, $Y_3$, $Y_4$, $Y_5$ and $Y_6$ are each H or F. n and m are each 0 or 1.

In the general formulae (2) to (13),

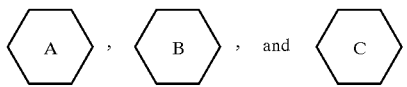

are each a trans-1-sila-1,4-cyclohexylene, trans-4-sila-1,4-cyclohexylene or trans-1,4-cyclohexylene group.

In the general formulae (4), (7) and (10), specific examples of the partial skeleton structure

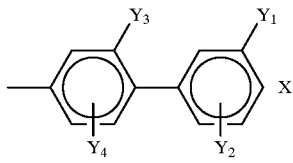

are preferably follows:

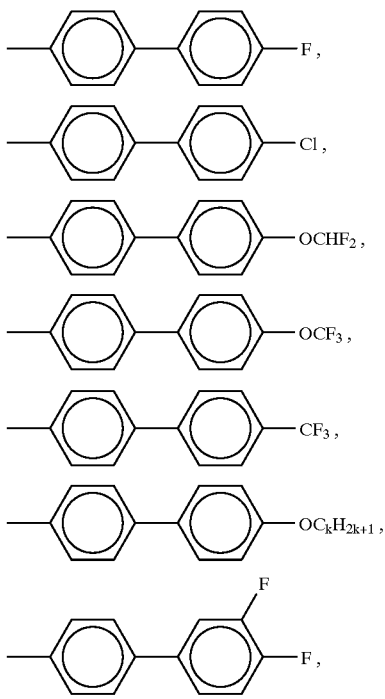

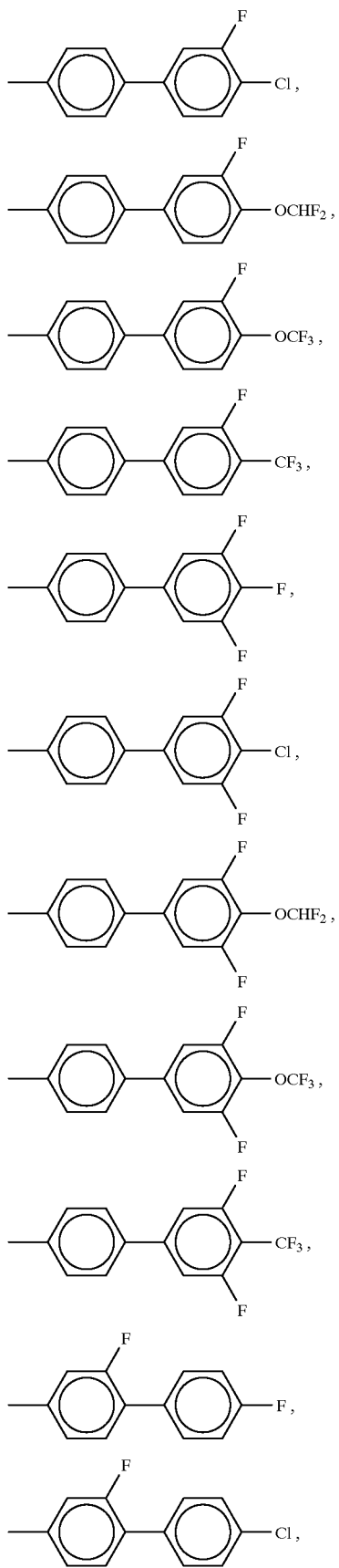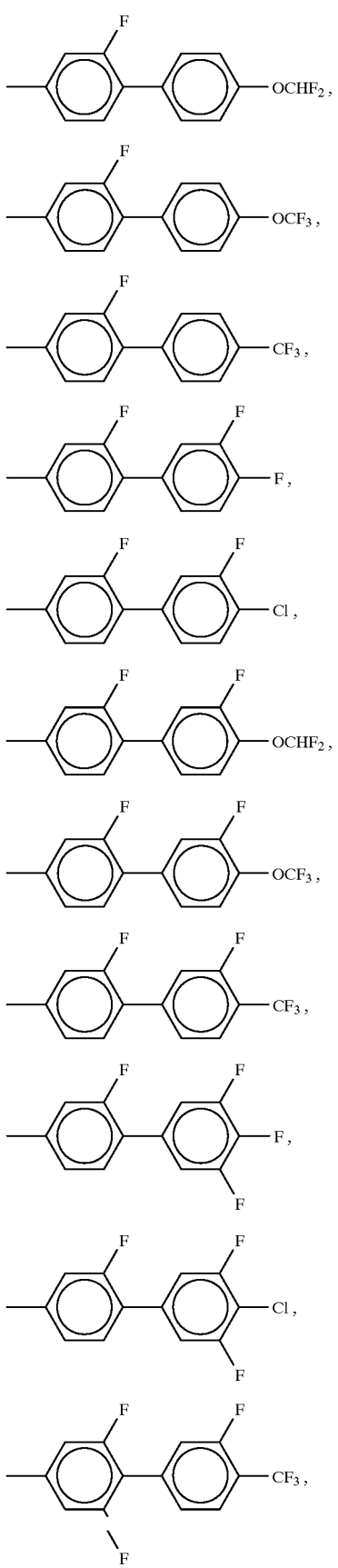

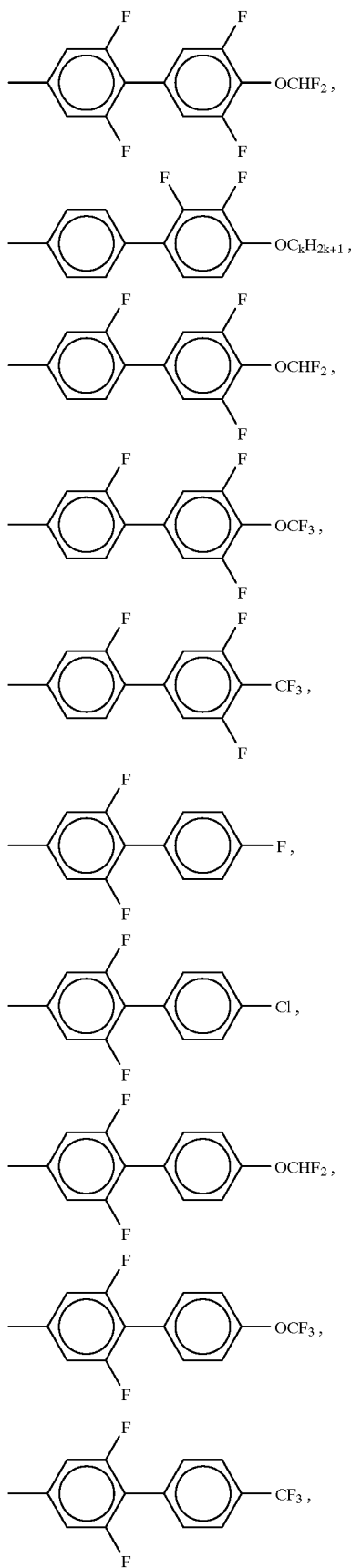
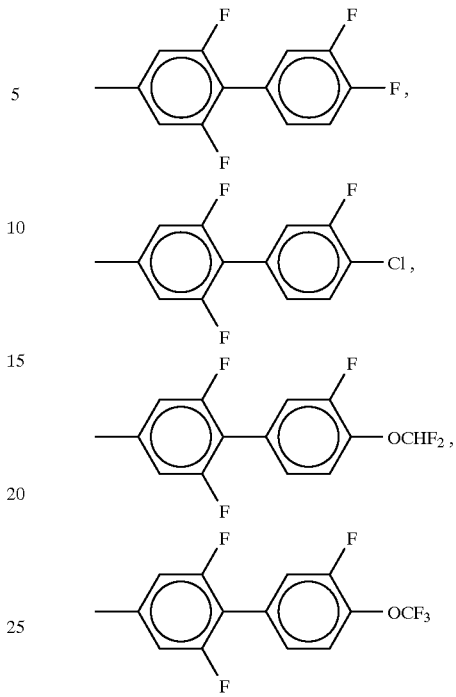
In the general formulae (8) and (12), specific examples of the partial skeleton structure
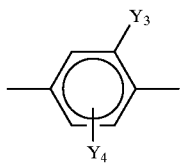
are preferably follows:
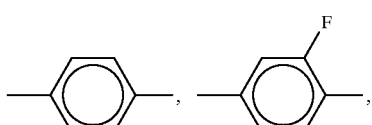
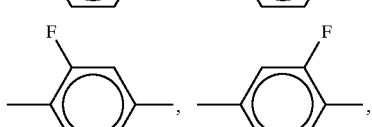
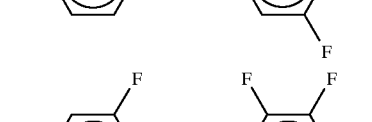
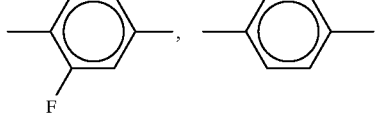
In the general formulae (9) and (13), specific examples of the partial skeleton structure

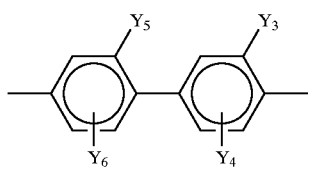
are preferably follows:
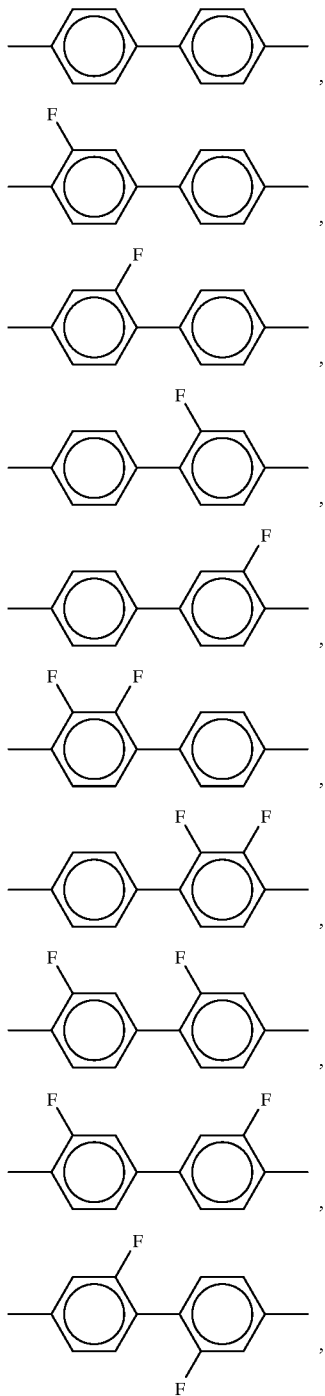
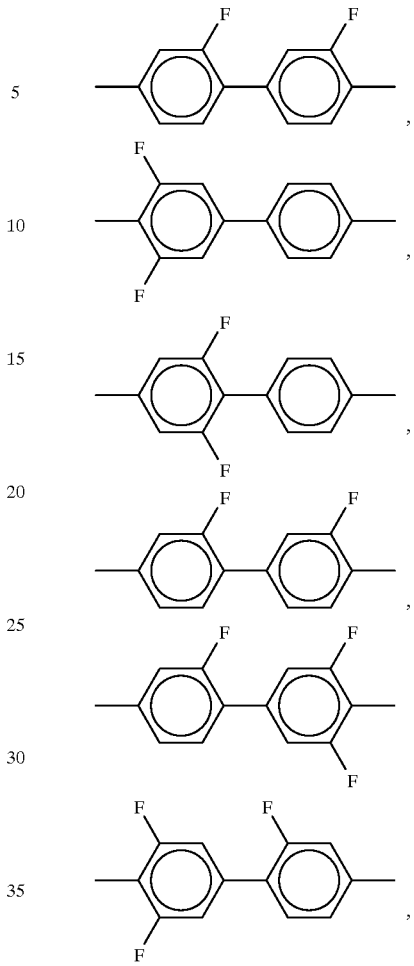
Now, specific chemical structures represented by the general formulae (2) to (13), which may be used together with two or more compounds of the general formula (1), are presented.
Specific chemical structures represented by the general formula (2) are follows:
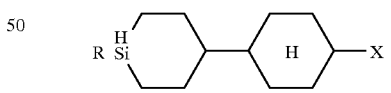
(2a)
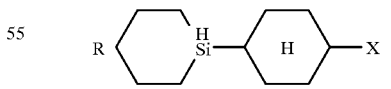
(2b)
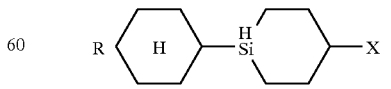
(2c)
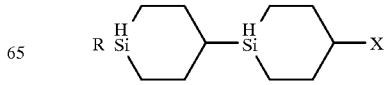
(2d)

-continued

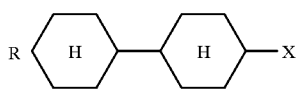
(2e)

In the general formula (2), the steric configurations of the silacyclohexane ring and the cyclohexane ring are both in trans form. The compounds (2a), (2c) and (2e) are preferable in the general formula (2).

Specific chemical structures represented by the general formula (3) are follows:

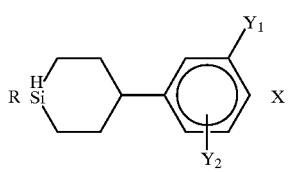
(3a)

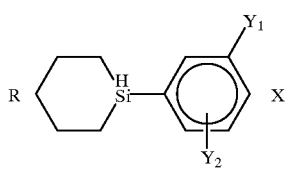
(3b)

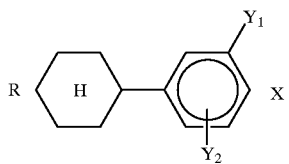
(3c)

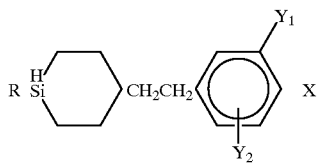
(3d)

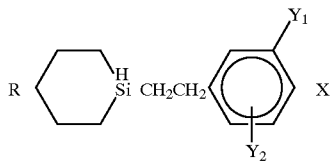
(3e)

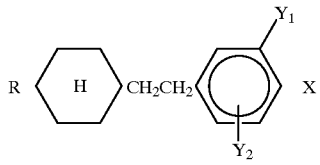
(3f)

In the general formula (3), the steric configurations of the silacyclohexane ring and the cyclohexane ring are both in trans form. The compounds (3a), (3c), (3d) and (3f) are preferable in the general formula (3).

Specific chemical structures represented by the general formula (4) are not listed here since it does not contain a saturated carbon ring.

Specific chemical structures represented by the general formula (5) are follows:

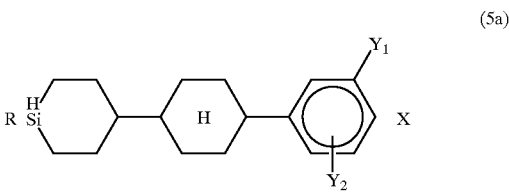
(5a)

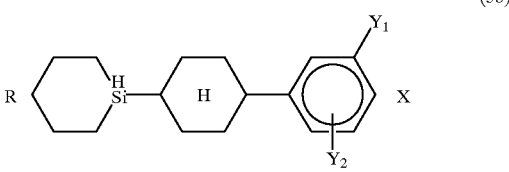
(5b)

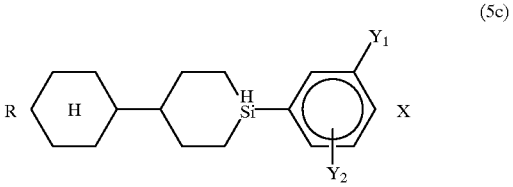
(5c)

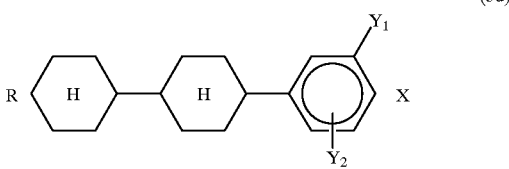
(5d)

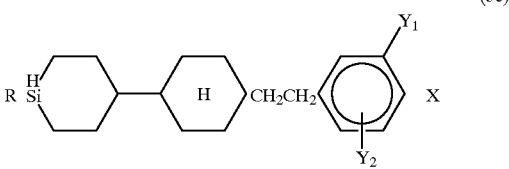
(5e)

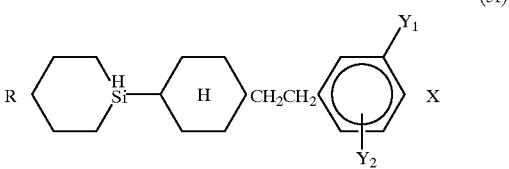
(5f)

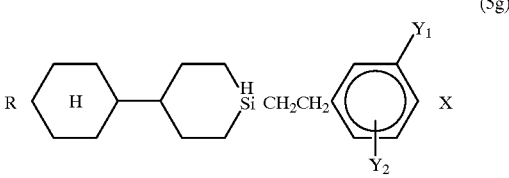
(5g)

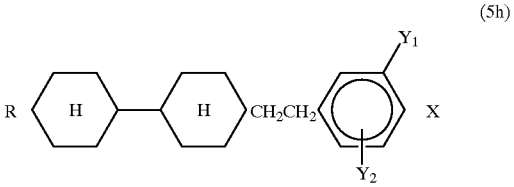
(5h)

In the general formula (5), the steric configurations of the silacyclohexane ring and the cyclohexane ring are both in trans form. The compounds (5a), (5d), (5e) and (5h) are preferable in the general formula (5).

Specific chemical structures represented by the general formula (6) are follows:

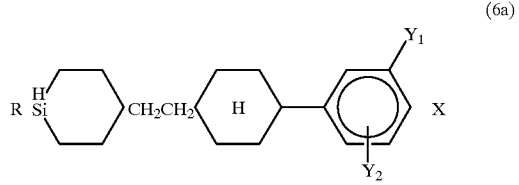
(6a)

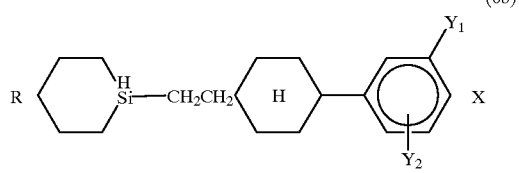
(6b)

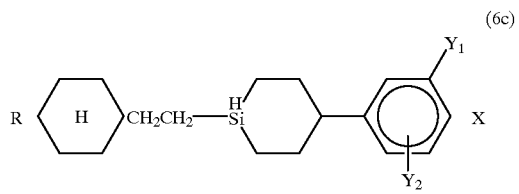
(6c)

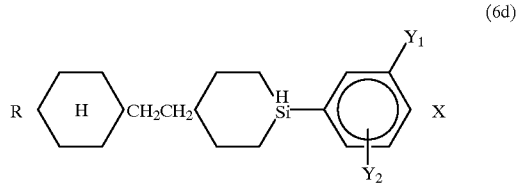
(6d)

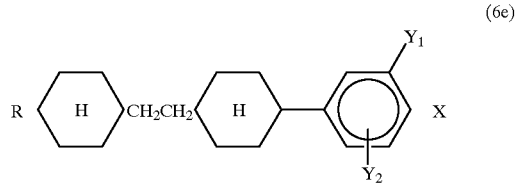
(6e)

In the general formula (6), the steric configurations of the silacyclohexane ring and the cyclohexane ring are both in trans form. The compounds (6a), (6c) and (6e) are preferable in the general formula (6).

Specific chemical structures represented by the general formula (7) are follows:

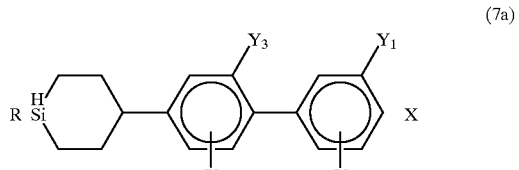
(7a)

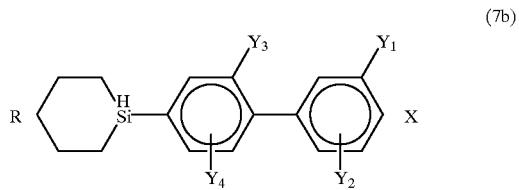
(7b)

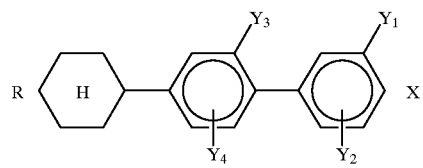
(7c)

In the general formula (7), the steric configurations of the silacyclohexane ring and the cyclohexane ring are both in trans form. The compounds (7a) and (7c) are preferable in the general formula (7).

Specific chemical structures represented by the general formula (8) are follows:

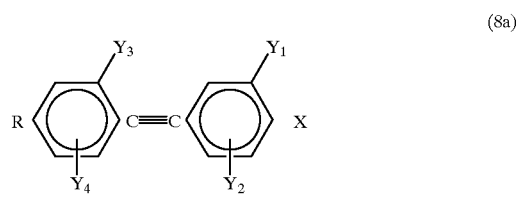
(8a)

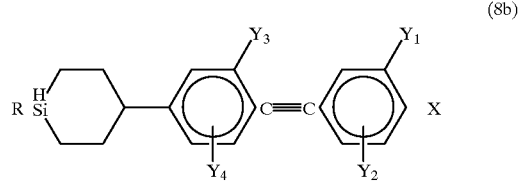
(8b)

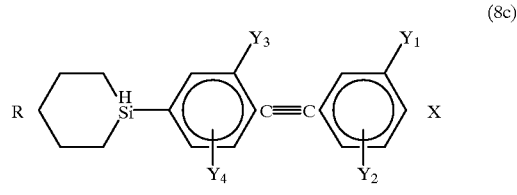
(8c)

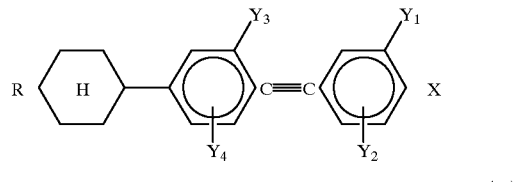
(8d)

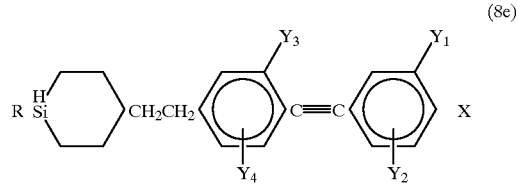
(8e)

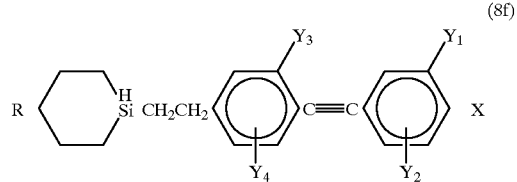
(8f)

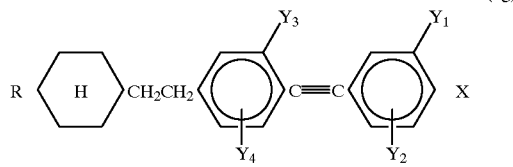
(8g)
In the general formula (8), the steric configurations of the silacyclohexane ring and the cyclohexane ring are both in trans form. The compounds (8a), (8b), (,8d), (8e) and (8g) are preferable in the general formula (8).
Specific chemical structures represented by the general formula (9) are follows:
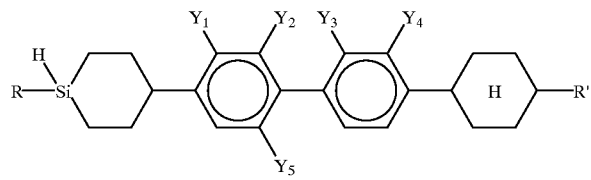
(9a)
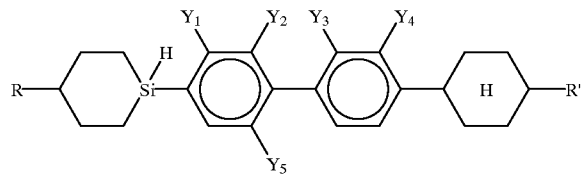
(9b)
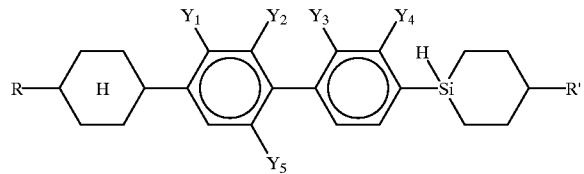
(9c)
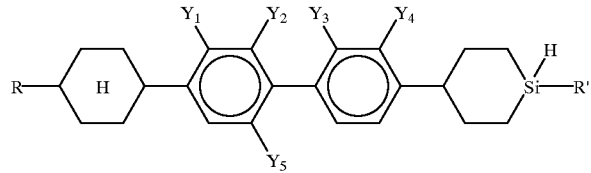
(9d)
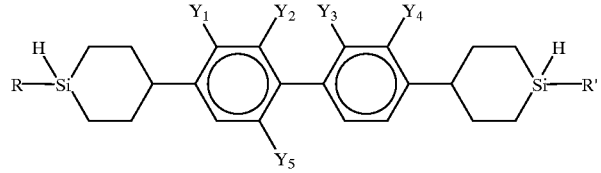
(9e)
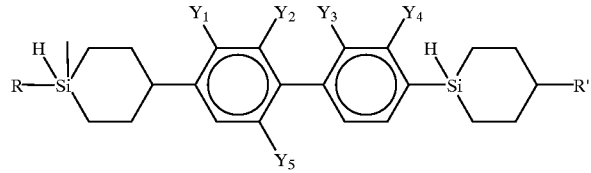
(9f)

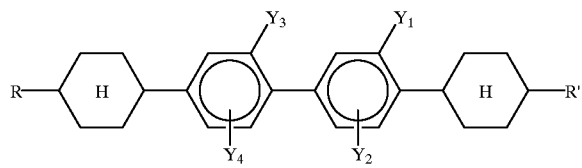
(9g)
In the general formula (9), the steric configurations of the silacyclohexane ring and the cyclohexane ring are both in trans form. The compounds (9a), (9d) and (9g) are preferable in the general formula (9).
Specific chemical structures represented by the general formula (10) are follows:
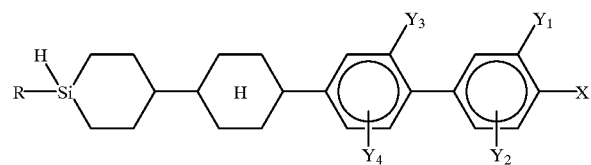
(10a)
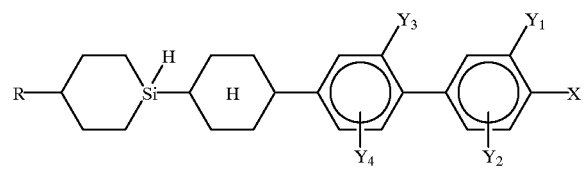
(10b)
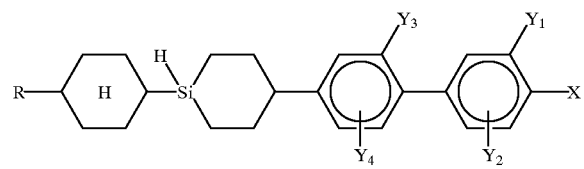
(10c)
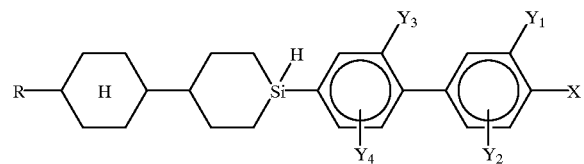
(10d)
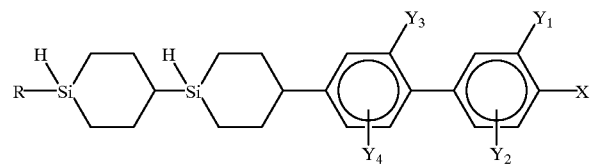
(10e)
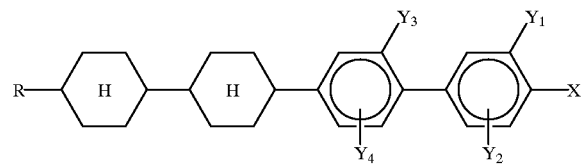
(10f)

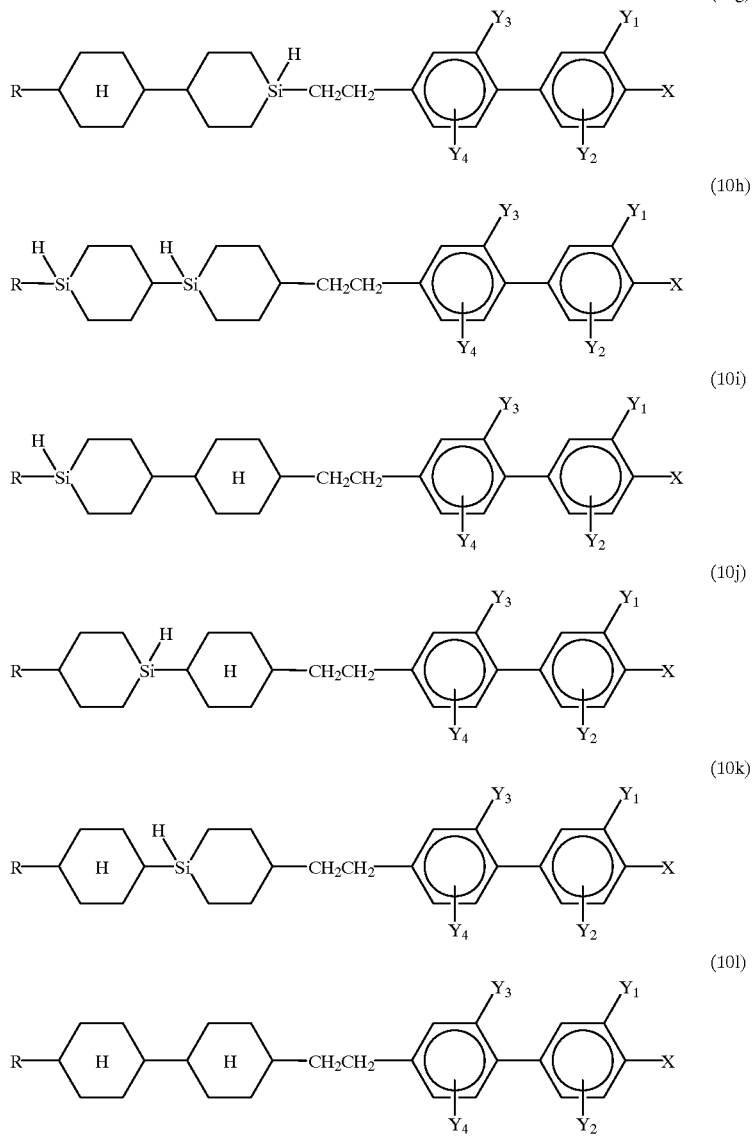
In the general formula (10), the steric configurations of the silacyclohexane ring and the cyclohexane ring are both in trans form. The compounds (10a), (10c), (10f), (10i), (10k) and (10l) are preferable in the general formula (10).
Specific chemical structures represented by the general formula (11) are follows:
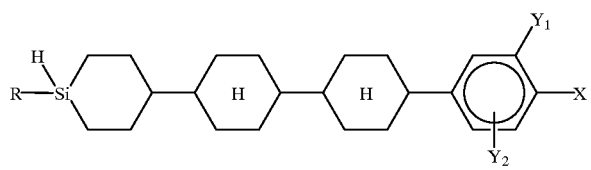

-continued
(11b)
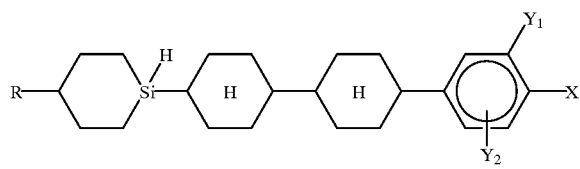
(11c)
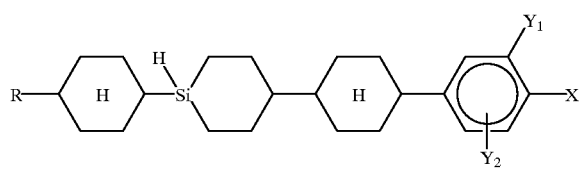
(11d)
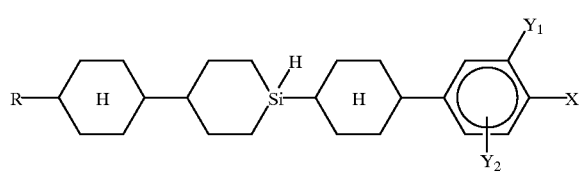
(11e)
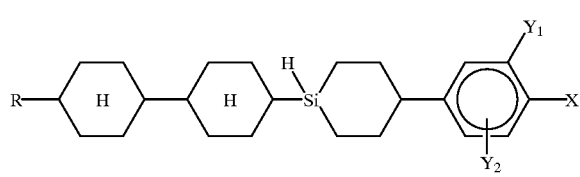
(11f)
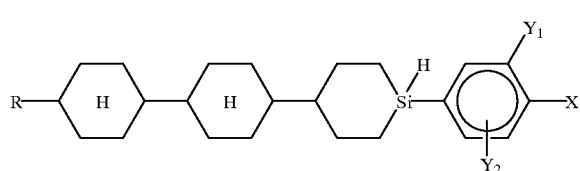
(11g)
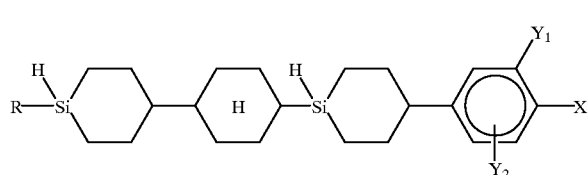
(11h)
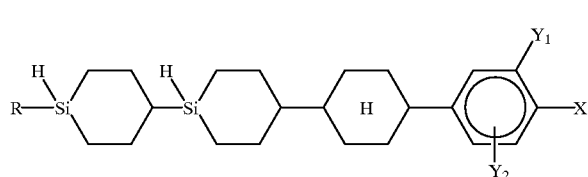
(11i)
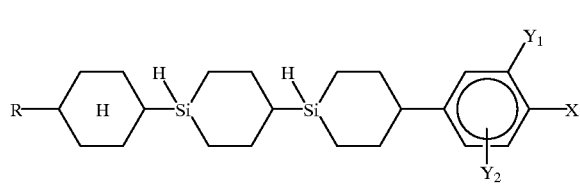

-continued
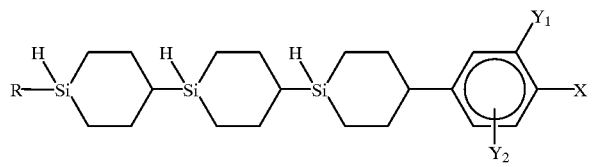
(11j)
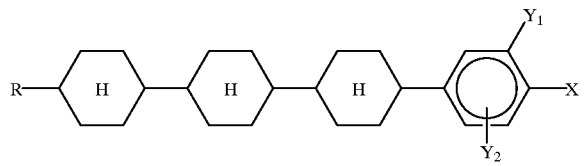
(11k)
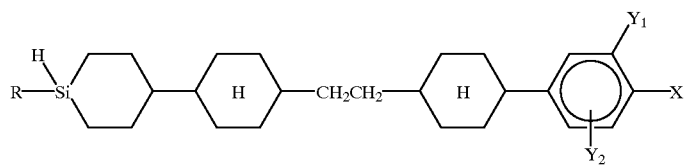
(11l)
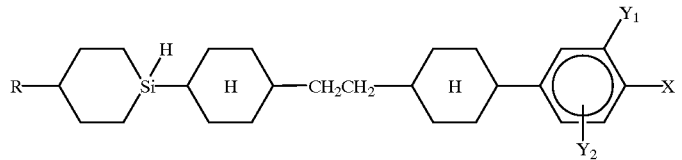
(11m)
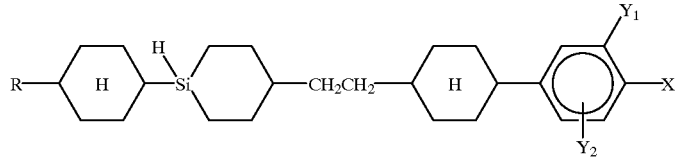
(11n)
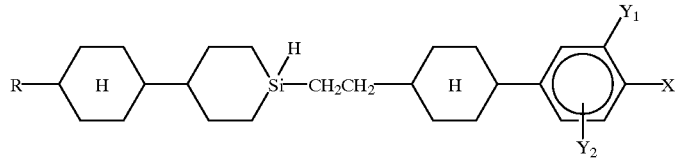
(11o)
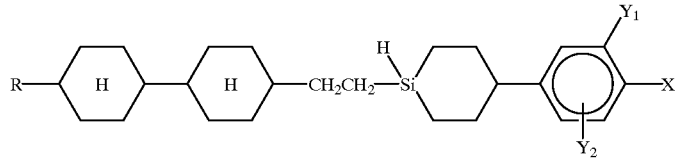
(11p)
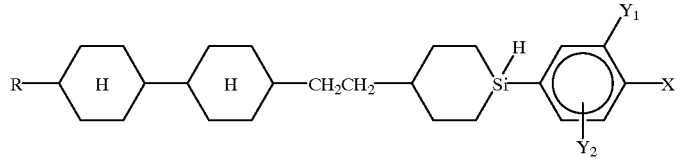
(11q)

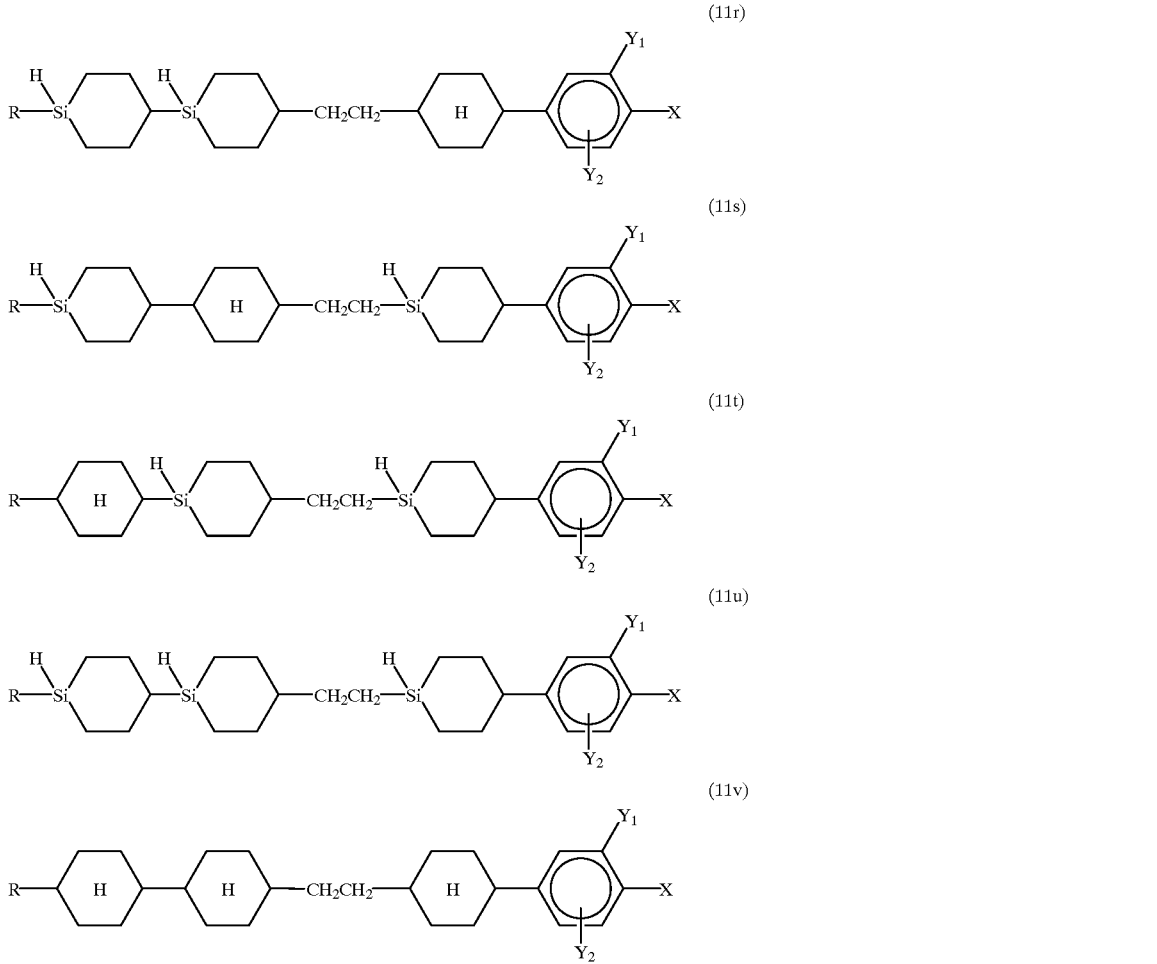
In the general formula (11), the steric configurations of the silacyclohexane ring and the cyclohexane ring are both in trans form. The compounds (11a), (11c), (11e), (11k), (11l), (11n), (11p) and (11v) are preferable in the general formula (11).
Specific chemical structures represented by the general formula (12) are follows:
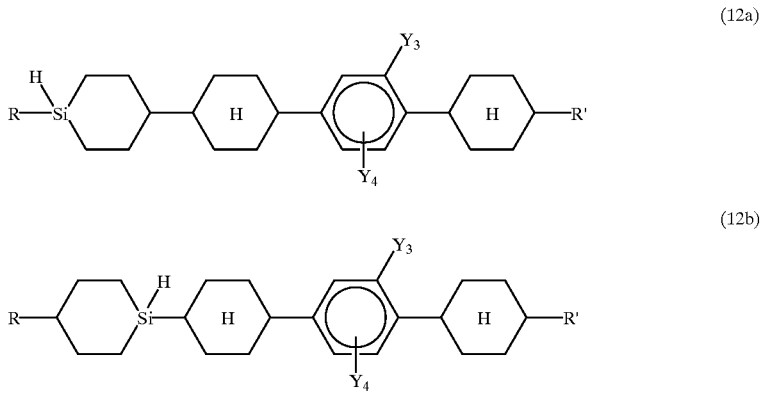

(12c)
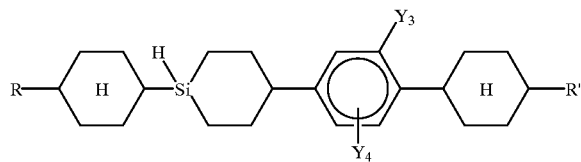
(12d)
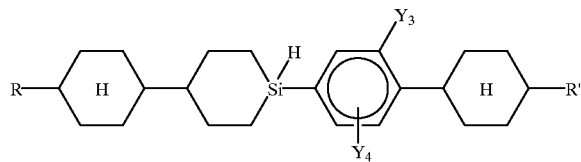
(12e)
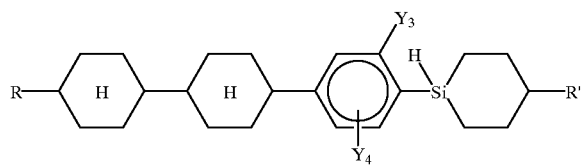
(12f)
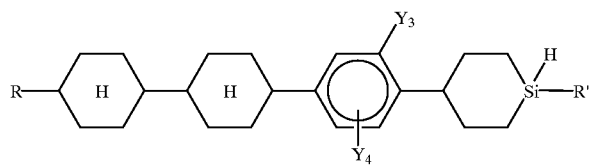
(12g)
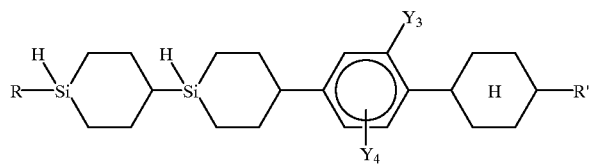
(12h)
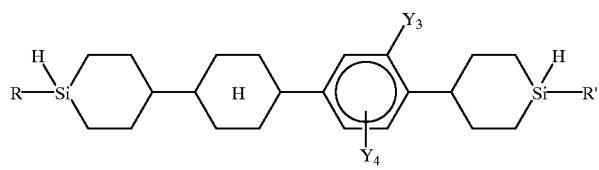
(12i)
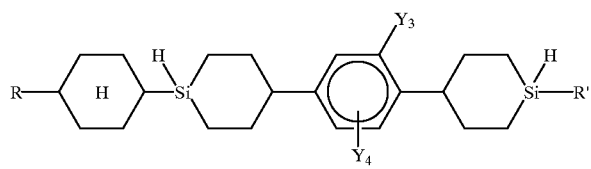
(12j)
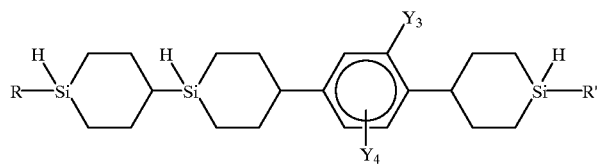

-continued
(12k)
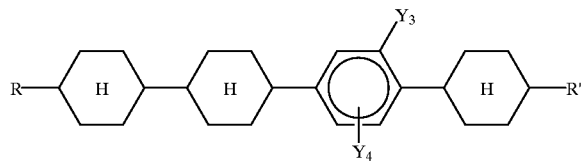
(12l)
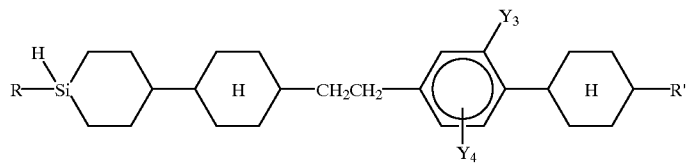
(12m)
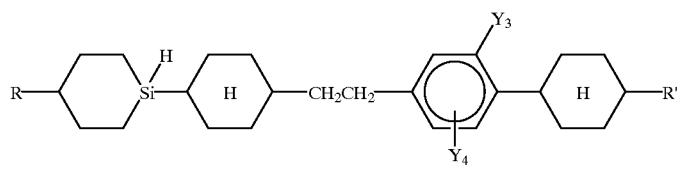
(12n)
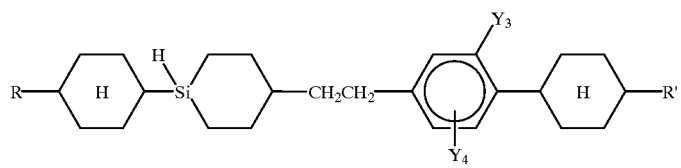
(12o)
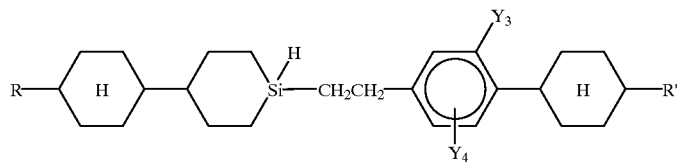
(12p)
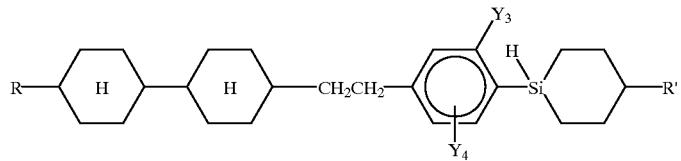
(12q)
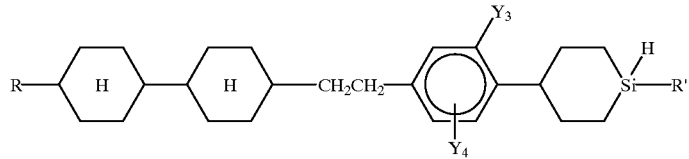
(12r)
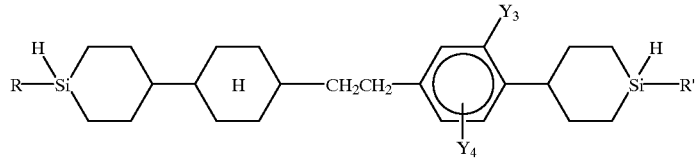

(12s)
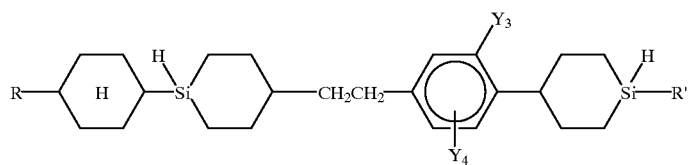
(12t)
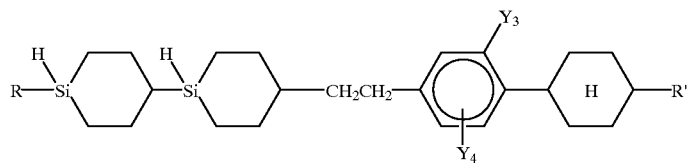
(12u)
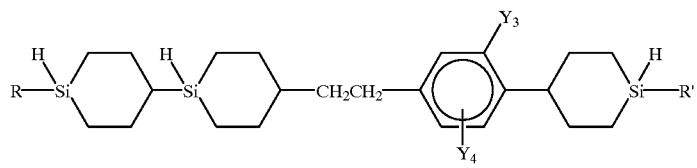
(12v)
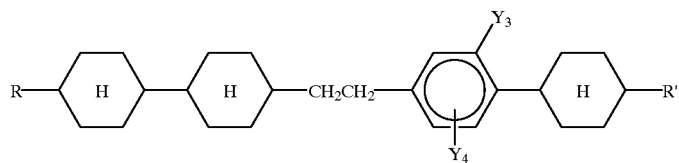
In the general formula (12), the steric configurations of the silacyclohexane ring and the cyclohexane ring are both in trans form. The compounds (12a), (12c), (12f), (12k), (12l), (12n), (12q) and (12v) are preferable in the general formula (12).
Specific chemical structures represented by the general formula (13) are follows:
(13a)
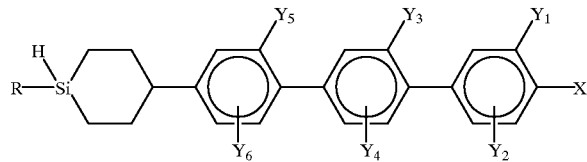
(13b)
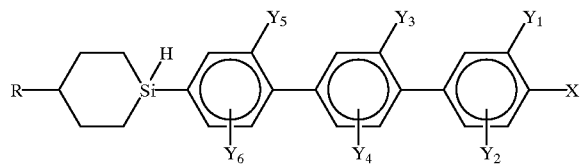
(13c)
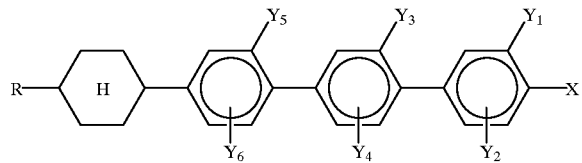

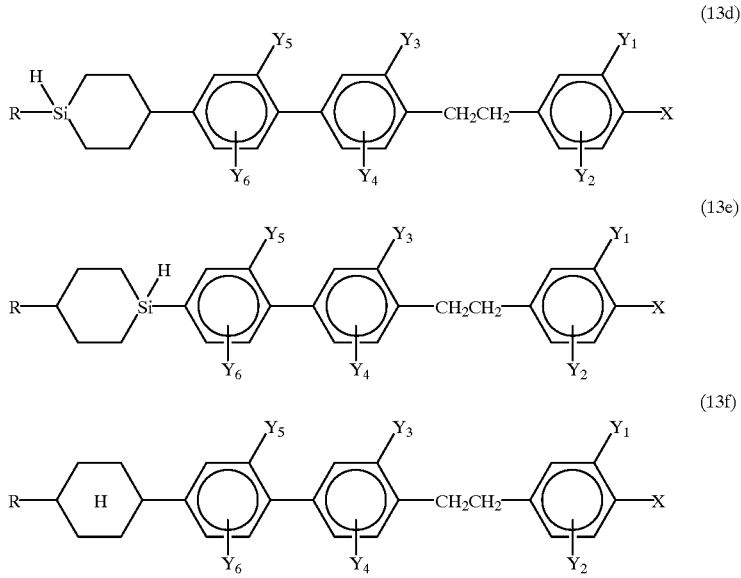

In the general formula (13), the steric configurations of the silacyclohexane ring and the cyclohexane ring are both in trans form. The compounds (13a), (13c), (13d) and (13f) are preferable in the general formula (13).

According to the present invention, liquid crystal compositions comprising two or more compounds of the general formula (1) and one or more compounds selected from the group consisting of the compounds of the general formulae (2) to (7), (9), and (10) are more preferable. It is further more preferable that the liquid crystal compositions comprise two or more compounds of the general formula (1) and one or more compounds selected from the group consisting of the compounds of the general formulae (2), (3), (5), (7) and (10).

As a preferable embodiment the liquid crystal composition of the present invention comprises two or more compounds of the general formula (1) and one or more compounds of the general formula (2).

Also as a preferable embodiment liquid crystal composition of the present invention comprises two or more compounds of the general formula (1) and one or more compounds of the general formula (3). It is more preferable that the liquid crystal composition comprises two or more compounds of the general formula (1), one or more compounds of the general formula (3), and one or more compounds selected from the group consisting of the compounds of the general formulae (2) and (4) to (13). The compounds of the general formulae (2), and (4) to (13) are more preferably of the general formulae (2), (4), (5) to (7), (9), and (10), further more preferably of the general formulae (2), (5), (7) and (10).

Further as a preferable embodiment the liquid crystal composition of the present invention comprises two or more compounds of the general formula (1) and one or more compounds of the general formula (5). It is more preferable that the liquid crystal composition comprises two or more compounds of the general formula (1), one or more compounds of the general formula (5), and one or more compounds selected from the group consisting of the compounds of the general formulae (2) to (4), and (6) to (13). The compounds of the general formulae (2) to (4), and (6) to (13) are more preferably of the general formulae (2) to (4), (6), (7), (9), and (10), and further more preferably (2), (3), (7) and (10).

Two or more compounds of the general formula (1) of the present invention may be contained in total in 10 to 100 mol % of a total composition. Especially for controlling the refractive index anisotropy (Δn), they may be contained preferably in total in 10 to 90 mol %, more preferably in total in 40 to 90 mol %. It is preferable that one or more compounds having a two ring structure such as the compounds of the general formulae (2), (3), and (4) are added in total in 0 to 50 mol % of a total composition, one or more compounds having a three ring structure such as the compounds of the general formulae (5), (6), (7) and (8) are in total in 0 to 70 mol % of a total composition, and one or more compounds having a four ring structure such as the compounds of the general formulae (9) to (13) are added in total in 0 to 40 mol % of a total composition.

In two or more compounds other than the compounds of the general formula (1) in the composition of the present invention, one or more compounds selected from the group consisting of the compounds of the general formulae (2) to (13) may be contained in total in 90 mol % or less. Thus, suitable selection of one or more compounds from the group may be carried in total in 90 mol % or less.

It is preferable that one or more compounds having at least one silacyclohexane ring are contained in total in 30 mol % or more in the composition of the present invention.

In order to effect low driving voltage and high response speed at the same time, the portion of two or more compounds of the general formula (1) should be increased as much as possible. However, each application requires different properties according to priority so that, for example, allowed values for the refractive index anisotropy (Δn) and dielectric constant anisotropy (Δε) are variable. Accordingly, one or more compounds of the general formulae (2) to (13) are added to form a composition to satisfy the required properties.

In order to keep Δn in the generally required range of 0.07 to 0.13, although Δn is variable depending on the display mode of the liquid crystal display panel, the portion of two or more compounds of the general formula (1) may be in the range of 10 to 90 mol % of the total composition.

In order to mix these components, desired amounts of minor components may be dissolved in major components by mixing, or by application of heat at 30° C. to 100° C. Alternatively, this may be done by dissolving each component in one to ten times volume of an organic solvent such as hexane, methanol or chloroform, mixing the resulting solutions, and then evaporating the organic solvent.

The liquid crystal compositions of the present invention, which can be prepared in the above-described manner, have a nematic liquid crystal phase over a wide temperature range extending from a lower limit of −30° C. or below to an upper limit of 70–100° C. They do not produce a smectic phase or a crystalline phase even after long-term storage at −30° C.

Their Δε and Δn are in wide ranges of −6 to +12, and 0.06 to 0.20, respectively. Their threshold voltages are preferably not higher than 2.2 V, more preferably in the range of 1.0 to 1.6 V. As to the voltage holding ratio, they exhibit a value of 98% or greater even when measured at 100° C.

When used in liquid crystal display elements, the liquid crystal compositions of the present invention can contain other additives including, for example, polychromatic dyes to form a colored guest-host system, and chiral dopants for imparting a desired twisting direction and strength thereto. The liquid crystal compositions containing such additives may be used in liquid crystal display elements by sandwiching them between transparent substrates on which active elements such as TFTs or MIMs are formed. These display elements may have various undercoats, orientation-controlling overcoats, polarizing plates, filters, reflective layers and the like as required. Moreover, these display elements may be constructed in various ways, for example, by forming them into multilayer cells, combining them with other display elements, using semiconductor substrates, or using light sources.

The present invention is further illustrated by Examples 1 to 8.

Liquid crystal compositions in accordance with the present invention were prepared by weighing out predetermined amounts of various components, mixing them, and heating the resulting mixture until a solution in an isotropic state was obtained.

In the "composition of mixture" described in following examples, all percentages are mole percentages.

The definitions of the symbols given in the examples and the measuring conditions therefor are as follows.

$T_{NI}$: Nematic-isotropic transition temperature (° C.).

$V_{th}$: Threshold voltage

This designates the applied voltage at which the transmittance reaches 90% after decreasing from an initial value (100%) by 10% under the following conditions.

Cell electrode are: 1 cm$^2$.

Cell gap: 5 μm (TN cell).

Oriented film: Polyimide LX-1400 (manufactured by Hitachi Chemical Co., Ltd.).

Measuring frequency: 32 Hz square wave.

Measuring mode: normally white.

Measuring temperature: 25° C.

$T_{on}$: initial response time (msec)

This designates the time in which the transmittance reaches 10% after selective voltage (±5V) is applied, while non-selective voltage ±0.5V.

$T_{off}$: trailing response time (msec)

This designates the time in which the transmittance reaches 90% after selective voltage is turned off, while non-selective voltage ±0.5V.

VHR: Voltage holding ratio.

This designates the holding ratio of an interelectrode voltage waveform which was measured under the following conditions.

Cell electrode area: 1 cm$^2$.

Cell gap: 5 μm (TN cell).

Oriented film: Polyimide AL-1051 (manufactured by Japan Synthetic Rubber Co., Ltd.).

Measuring frequency: 30 Hz square wave.

Measuring temperature: 100° C.

Pulse width: 60 μsec (±5 V TTL).

Δn: Refractive index anisotropy.

This designates the difference between the extraordinary index ($n_e$) and ordinary index ($n_o$) which were measured with an Abbe refractometer by placing a sample on a homeotropically oriented prism. The measuring temperature was 25° C. and the measuring wavelength was 589.3 nm.

EXAMPLE 1

The following liquid crystal composition of the mixture consisting of two components, which are compounds of X=F, $Y_1$=F, $Y_2$=H, R=n-propyl and n-pentyl in the general formula (1a):

4-(trans-4-(trans-4-n-propylcyclohexyl)-4-silacyclohexyl)-1,2-difluorobenzene 75%

4-(trans-4-(trans-4-n-pentylcyclohexyl)-4-silacyclohexyl)-1,2-difluorobenzene 25% showed the following characteristic properties:

$T_{NI}$=80.6° C., $V_{th}$=1.43 V, $T_{on}$=9.0 msec, $T_{off}$=33.0 msec, $T_{on}$+$T_{off}$=42.0 msec, VHR=99.4%, Δn=0.0797.

COMPARATIVE EXAMPLE 1

The following liquid crystal composition of the mixture consisting of two components, which are compounds of X=F, $Y_1$=F, $Y_2$=H, R=n-propyl and n-pentyl in the general formula (5a):

4-(trans-4-(trans-4-n-propyl-4-silacyclohexyl)cyclohexyl)-1,2-difluorobenzene 46%

4-(trans-4-(trans-4-n-pentyl-4-silacyclohexyl)cyclohexyl)- 1,2-difluorobenzene 54% showed the following properties:

$T_{NI}$=75.7° C., $V_{th}$=1.49 V, $T_{on}$=16.0 msec, $T_{off}$=48.0 msec, $T_{on}$+$T_{off}$=64.0 msec, VHR=99.4%, Δn=0.0753.

Consequently, $T_{NI}$ was lower, the threshold voltage was higher, and the response speed was lower, comparing with Example 1. The threshold voltage will be lowered when liquid crystal compounds having a silane atom introduced on an optimized position are mandatory components in a liquid crystal composition.

COMPARATIVE EXAMPLE 2

The composition of the mixture consisting of two components, which are compounds of X=F, $Y_1$=F, $Y_2$=H, R=n-propyl and n-pentyl in the general formula (5d) was a crystal at room temperature and did not show a liquid crystal property, even if the mixing ratios were changed. Therefore, in order to lower the melting point, the compound having R=ethyl in the general formula (5d) was further added as the third component. The resulting composition was in liquid crystal state and properties thereof were measured. That is, the following liquid crystal composition consisting of the compounds:

4-(trans-4-(trans-4-ethylcyclohexyl)cyclohexyl)-1,2-difluorobenzene 38%

4-(trans-4-(trans-4-n-propylcyclohexyl)cyclohexyl)-1,2-difluorobenzene 34%

4-(trans-4-(trans-4-n-pentylcyclohexyl)cyclohexyl)-1,2-difluorobenzene 28% showed the following properties:

$T_{NI}$=108.7° C., $V_{th}$=1.66 V, $T_{on}$=13.0 msec,
$T_{off}$=33.0 msec, $T_{on}$+$T_{off}$=46.0 msec,
VHR=99.4%, Δn=0.0801.

Although $T_{NI}$ was higher than those of Example 1 and Comparative Example 1, the threshold voltage was higher than those of Example 1 and Comparative Example 1. The response speed was faster than that of Comparative Example 1, but slower than that of Example 1. The threshold voltage will be lowered when liquid crystal compounds having a silane atom introduced on an optimized position are mandatory components in a liquid crystal composition.

EXAMPLE 2

The liquid crystal composition consisting of the compounds of the general formula (1a), that is, i) 25% in total for the compounds having X=$Y_1$=F, $Y_2$=H, and R=n-propyl and n-pentyl of the general formula (1a):
   4-(trans-4-(trans-4-n-propylcyclohexyl)-4-silacyclohexyl)-1,2-difluorobenzene 18.7%
   4-(trans-4-(trans-4-n-pentylcyclohexyl)-4-silacyclohexyl)-1,2-difluorobenzene 6.3% ii) 35% in total for the compounds having X=$Y_1$=$Y_2$=F, and R=n-propyl and n-pentyl of the general formula (1a):
   4-(trans-4-(trans-4-n-propylcyclohexyl)-4-silacyclohexyl)-1,2,6-trifluorobenzene 29.0%
   4-(trans-4-(trans-4-n-pentylcyclohexyl)-4-silacyclohexyl)-1,2,6-trifluorobenzene 6.0% and 40% for the combination of the following compounds of the present invention:
   4-(trans-4-n-pentyl-4-silacyclohexyl)-1-methoxybenzene (of the general formula (3a)) 10.0%
   4-(trans-4-(trans-4-n-propylcyclohexyl)cyclohexyl)-1-trifluoromethoxybenzene (of (5d)) 2.0%
   4-(trans-4-(trans-4-n-butylcyclohexyl)cyclohexyl)-1-trifluoromethoxybenzene (of (5d)) 1.5%
   4-(trans-4-(trans-4-n-pentylcyclohexyl)cyclohexyl)-1-trifluoromethoxybenzene (of (5d)) 1.5%
   4-(trans-4-n-propyl-4-silacyclohexyl)-3'-fluoro-4'-difluoromethoxybiphenyl (of (7a)) 4.5%
   4-(trans-4-n-pentyl-4-silacyclohexyl)-3'-fluoro-4'-difluoromethoxybiphenyl (of (7a)) 5.5%
   trans, trans-4-(4-(4-n-propyl-4-silacyclohexyl)cyclohexyl)-3',4',5'-trifluorobiphenyl (of (10a)) 8.3%
   trans, trans-4-(4-(4-n-pentyl-4-silacyclohexyl)cyclohexyl)-3',4',5'-trifluorobiphenyl (of (10a)) 6.7% showed the following characteristic properties:

$T_{NI}$=87.4° C., $V_{th}$=1.20 V, $T_{on}$=11.5 msec,
$T_{off}$=38.6 msec, $T_{on}$+$T_{off}$=50.1 msec, VHR=99.2%,
Δn=0.0945.

Example 1 is the example of the liquid crystal composition consisting of only the compounds of the general formula (1) of the present invention, while Example 2 is the example of the liquid crystal composition consisting of the compounds of the general formula (2), (5), (7), (10), as well as the compounds of the general formula (1).

COMPARATIVE EXAMPLE 3

The liquid crystal composition was prepared in the same way as the Example 2, except using the compounds of the general formula (5a) in the place of the compounds of the general formula (1a), that is, i) 25% in total for the compounds having X=$Y_1$=F, $Y_2$=H, and R=n-propyl and n-pentyl of the general formula (5a):
   4-(trans-4-(trans-4-n-propyl-4-silacyclohexyl)cyclohexyl)-1,2-difluorobenzene 11.5%
   4-(trans-4-(trans-4-n-pentyl-4-silacyclohexyl)cyclohexyl)-1,2-difluorobenzene 13.5% ii) 35% in total for the compounds having X=$Y_1$=$Y_2$=F, and R=n-propyl and n-pentyl of the general formula (1a):
   4-(trans-4-(trans-4-n-propyl-4-silacyclohexyl)cyclohexyl)-1,2,6-trifluorobenzene 22.7%
   4-(trans-4-(trans-4-n-pentyl-4-silacyclohexyl)cyclohexyl)-1,2,6-trifluorobenzene 12.3%

The resulting liquid crystal composition showed the following properties:

$T_{NI}$=83.5° C., $V_{th}$=1.30 V, $T_{on}$=12.4 msec, $T_{off}$=46.6 msec,
$T_{on}$+$T_{off}$=59.0 msec, VHR=99.2%, Δn=0.0935.

Comparative Example 3 showed lower response speed than Example 2.

EXAMPLE 3

The liquid crystal composition consisting of the following compounds showed properties below.
   4-(trans-4-(trans-4-n-propylcyclohexyl)-4-silacyclohexyl)-1,2,6-trifluorobenzene 21.4%
   4-(trans-4-(trans-4-n-pentylcyclohexyl)-4-silacyclohexyl)-1,2,6-trifluorobenzene 4.4%
   4-(trans-4-(trans-4-n-propylcyclohexyl)-4-silacyclohexyl)-1-trifluoromethoxybenzene 14.6%
   4-(trans-4-(trans-4-n-pentylcyclohexyl)-4-silacyclohexyl)-1-trifluoromethoxybenzene 9.0%
   4-(trans-4-n-heptyl-4-silacyclohexyl)-1,2,6-trifluorobenzene 25.5%
   4-(trans-4-n-propyl-4-silacyclohexyl)-2,6,3',5'-tetrafluoro-4'-(2'-trifluoroethoxy)biphenyl 1.0%
   4-(trans-4-n-pentyl-4-silacyclohexyl)-2,6,3',5'-tetrafluoro-4'-(2'-trifluoroethoxy)biphenyl 2.1%
   trans,trans-4-(4-(4-n-propyl-4-silacyclohexyl)cyclohexyl)-3',4',5'-trifluorobiphenyl 12.1%
   trans,trans-4-(4-(4-n-pentyl-4-silacyclohexyl)cyclohexyl)-3',4',5'-trifluorobiphenyl 9.9% properties:

$T_{NI}$=65.2° C., $V_{th}$=1.03 V, $T_{on}$=5.7 msec,
$T_{off}$=50.8 msec, $T_{on}$+$T_{off}$=56.5 msec, VHR=99.2%,
Δn=0.0855.

COMPARATIVE EXAMPLE 4

The liquid crystal composition consisting of the following compounds showed properties below.
   4-(trans-4-n-heptyl-4-silacyclohexyl)-1,2,6-trifluorobenzene 25.5%
   4-(trans-4-(trans-4-n-propyl-4-silacyclohexyl)cyclohexyl-1,2,6-trifluorobenzene 16.8%
   4-(trans-4-(trans-4-n-pentyl-4-silacyclohexyl)cyclohexyl)-1,2,6-trifluorobenzene 8.9%
   4-(trans-4-(trans-4-n-propyl-4-silacyclohexyl)cyclohexyl)-1-trifluoromethoxybenzene 13.8%
   4-(trans-4-(trans-4-n-pentyl-4-silacyclohexyl)cyclohexyl-1-trifluoromethoxybenzene 9.9%
   4-(trans-4-n-propyl-4-silacyclohexyl)-2,6,3',5'-tetrafluoro-4'-(2'-trifluoroethoxy)biphenyl 1.0%

4-(trans-4-n-pentyl-4-silacyclohexyl)-2,6,3',5'-tetrafluoro-4'-(2'-trifluoroethoxy)biphenyl 2.1% trans,trans-4-(4-(4-n-propyl-4-silacyclohexyl) cyclohexyl-3',4',5'-trifluorobiphenyl 12.1% trans,trans-4-(4-(4-n-pentyl-4-silacyclohexyl) cyclohexyl-3',4',5'-trifluorobiphenyl 9.9% properties:

$T_{NI}$=59.8° C., $V_{th}$=1.1 V, $T_{on}$=7.0 msec, $T_{off}$=60.2 msec, $T_{on}$+$T_{off}$=67.2 msec, VHR=99.2%, Δn=0.0840.

Comparative Example 4 showed lower response speed than Example 3.

EXAMPLE 4

The liquid crystal composition consisting of the following compounds showed properties below.

4-(trans-4-(trans-4-n-propylcyclohexyl)-4-silacyclohexyl)-1-fluorobenzene 14.0%

4-(trans-4-(trans-4-n-butylcyclohexyl)-4-silacyclohexyl)-1-fluorobenzene 9.2%

4-(trans-4-(trans-4-n-pentylcyclohexyl)-4-silacyclohexyl)-1-fluorobenzene 6.8%

4-(trans-4-(trans-4-n-propylcyclohexyl,)-4-silacyclohexyl)-1-trifluoromethoxybenzene 16.7%

4-(trans-4-(trans-4-n-pentylcyclohexyl)-4-silacyclohexyl)-1-trifluoromethoxybenzene 10.3%

4-(trans-4-(trans-4-n-propylcyclohexyl)-4-silacyclohexyl)-2-fluoro-1-methylbenzene 6.5%

4-(trans-4-(trans-4-n-pentylcyclohexyl)-4-silacyclohexyl)- 2-fluoro-1-methylbenzene 8.5% trans-4-(trans-4-n-pentylcyclohexyl)-1-methoxycyclohexane 28.0% properties:

$T_{NI}$=80.6° C., $V_{th}$=1.95 V, $T_{on}$=15.8 msec, $T_{off}$=20.0 msec, $T_{on}$+$T_{off}$=35.8 msec, VHR=99.6%, Δn=0.0749.

COMPARATIVE EXAMPLE 5

The liquid crystal composition consisting of the following compounds showed properties below.

trans-4-(trans-4-n-pentyl)-1-methoxycyclohexyane 28.0%

4-(trans-4-(trans-4-n-propyl-4-silacyclohexyl) cyclohexyl-1-fluorobenzene 14.0%

4-(trans-4-(trans-4-n-pentyl-4-silacyclohexyl) cyclohexyl)-1-fluorobenzene 16.0%

4-(trans-4-(trans-4-n-propyl-4-silacyclohexyl) cyclohexyl)-1-trifluoromethoxybenzene 15.7%

4-(trans-4-(trans-4-n-pentyl-4-silacyclohexyl) cyclohexyl-1-trifluoromethoxybenzene 11.3%

4-(trans-4-(trans-4-n-propyl-4-silacyclohexyl) cyclohexyl-2-fluoro-1-methylbenzene 6.5%

4-(trans-4-(trans-4-n-pentyl-4-silacyclohexyl) cyclohexyl-2-fluoro-1-methylbenzene 8.5% properties:

$T_{NI}$=72.5° C., $V_{th}$=2.3 V, $T_{on}$=21.2 msec, $T_{off}$=23.4 msec, $T_{on}$+$T_{off}$=44.6 msec, VHR=99.2%, Δn=0.0730.

Comparative Example 5 showed higher threshold voltage than Example 4.

EXAMPLE 5

The liquid crystal composition consisting of the following compounds showed properties below.

4-(trans-4-(trans-4-n-propylcyclohexyl)-4-silacyclohexyl)-1,2,6-trifluorobenzene 14.4%

4-(trans-4-(trans-4-n-pentylcyclohexyl)-4-silacyclohexyl)-1,2,6-trifluorobenzene 3.0%

4-(trans-4-(trans-4-n-propylcyclohexyl)-4-silacyclohexyl)-1,2-difluorobenzene 11.0%

4-(trans-4-(trans-4-n-pentylcyclohexyl)-4-silacyclohexyl)-1,2-difluorobenzene 3.4%

4-(trans-4-(trans-4-n-propylcyclohexyl)-4-silacyclohexyl)-1-trifluoromethoxybenzene 30.4%

4-(trans-4-(trans-4-n-pentylcyclohexyl)-4-silacyclohexyl)-1-trifluoromethoxybenzene 18.9%

4-(trans-4-n-pentyl-4-silacyclohexyl)-1,2-difluorobenzene 4.0%

4-(trans-4-n-propyl-4-silacyclohexyl-2,6-difluoro-4'-trifluoromethoxybiphenyl 6.7%

4-(trans-4-n-pentyl-4-silacyclohexyl)-2,6-difluoro-4'-trifluoromethoxybiphenyl 8.2% properties:

$T_{NI}$=79.1° C., $V_{th}$=1.41 V, $T_{on}$=9.6 msec, $T_{off}$=33.6 msec, $T_{on}$+$T_{off}$=43.2 msec, VHR=99.4%, Δn=0.0875.

EXAMPLE 6

The liquid crystal composition consisting of the following compounds showed properties below.

4-(trans-4-(trans-4-n-propylcyclohexyl)-4-silacyclohexyl)-1,2,6-trifluorobenzene 17.5%

4-(trans-4-(trans-4-n-pentylcyclohexyl)-4-silacyclohexyl)-1,2,6-trifluorobenzene 3.6%

4-(trans-4-(trans-4-n-propylcyclohexyl)-4-silacyclohexyl)-1-trifluoromethoxybenzene 5.5%

4-(trans-4-(trans-4-n-pentylcyclohexyl)-4-silacyclohexyl)-1-trifluoromethoxybenzene 3.4%

4-(trans-4-(trans-4-n-propylcyclohexyl)-4-silacyclohexyl)-2,6-difluoro-1-difluoromethoxybenzene 8.2%

4-(trans-4-(trans-4-n-pentylcyclohexyl)-4-silacyclohexyl)-2,6-difluoro-1-difluoromethoxybenzene 7.7%

4-(trans-4-n-heptyl-4-silacyclohexyl)-1,2,6-trifluorobenzene 12.7%

4-(trans-4-(trans-4-n-propyl-4-silacyclohexyl) cyclohexyl)-1,2,6-trifluorobenzene 13.8%

4-(trans-4-(trans-4-n-pentyl-4-silacyclohexyl) cyclohexyl)-1,2,6-trifluorobenzene 7.3% trans,trans-4-(4-(4-n-propyl-4-silacyclohexyl) cyclohexyl)-3',4',5'-trifluorobiphenyl 11.2% trans,trans-4-(4-(4-n-pentyl-4-silacyclohexyl) cyclohexyl)- 3',4',5'-trifluorobiphenyl 9.1% properties:

$T_{NI}$=79.5° C., $V_{th}$=1.11 V, $T_{on}$=7.1 msec, $T_{off}$=50.2 msec, $T_{on}$+$T_{off}$=57.3 msec, VHR=99.2%, Δn=0.0896.

EXAMPLE 7

The liquid crystal composition consisting of the following compounds showed properties below.

4-(trans-4-(trans-4-n-propylcyclohexyl)-4-silacyclohexyl)-1,2-difluorobenzene 23.7%

4-(trans-4-(trans-4-n-pentylcyclohexyl)-4-silacyclohexyl)-1,2-difluorobenzene 7.4%

4-(2-trans-4-(trans-4-n-propylcyclohexyl)-4-silacyclohexyl)ethyl)-1,2,6-trifluorobenzene 10.5%

4-(2-trans-4-(trans-4-n-pentylcyclohexyl)-4-silacyclohexyl)ethyl)-1,2,6-trifluorobenzene 4.2%

4-(trans-4-(trans-4-n-propyl-4-silacyclohexyl) cyclohexyl)-1,2,6-trifluorobenzene 18.1%

4-(trans-4-(trans-4-n-pentyl-4-silacyclohexyl) cyclohexyl)-1,2,6-trifluorobenzene 9.6%

4-(trans-4-n-propyl-4-silacyclohexyl)-2,6-difluoro-4'-trifluoromethoxybiphenyl 2.0%

4-(trans-4-n-pentyl-4-silacyclohexyl)-2,6-difluoro-4'-trifluoromethoxybiphenyl 2.4%

4-(trans-4-n-propyl-4-silacyclohexyl)-2-fluoro-3',4',5'-trifluorobiphenyl 7.5%

4-(trans-4-n-pentyl-4-silacyclohexyl)-2-fluoro-3',4',5'-trifluorobiphenyl 6.1% properties:

$T_{NI}$=80.7° C., $V_{th}$=1.16 V, $T_{on}$=10.4 msec, $T_{off}$=47.6 msec, $T_{on}+T_{off}$=58.0 msec, VHR=99.2%, $\Delta n$=0.0930.

EXAMPLE 8

The liquid crystal composition consisting of the following compounds showed properties below.

4-(trans-4-(trans-4-n-propylcyclohexyl)-4-silacyclohexyl)-1-fluorobenzene 14.0%

4-(trans-4-(trans-4-n-butylcyclohexyl)-4-silacyclohexyl)-1-fluorobenzene 9.2%

4-(trans-4-(trans-4-n-pentylcyclohexyl)-4-silacyclohexyl)-1-fluorobenzene 6.88%

4-(trans-4-(trans-4-n-propylcyclohexyl)-4-silacyclohexyl)-1,2-difluorobenzene 15.3%

4-(trans-4-(trans-4-n-pentylcyclohexyl)-4-silacyclohexyl)-1,2-difluorobenzene 5.2%

4-(trans-4-(trans-4-n-propylcyclohexyl)-4-silacyclohexyl)-1-trifluoromethoxybenzene 12.4%

4-(trans-4-(trans-4-n-pentylcyclohexyl)-4-silacyclohexyl)-1-trifluoromethoxybenzene 7.7%

4-(trans-4-n-pentylcyclohexyl)-1-methoxybenzene 24.1%

4-(trans-4-n-propyl-4-silacyclohexyl)-2-fluoro-4'-ethoxybiphenyl 2.5%

4-(trans-4-n-pentyl-4-silacyclohexyl)-2-fluoro-4'-ethoxybiphenyl 2.8% properties:

$T_{NI}$=87.0° C., $V_{th}$=1.70 V, $T_{on}$=14.8 msec, $T_{off}$=23.7 msec, $T_{on}+T_{off}$=38.5 msec, VHR=99.5%, $\Delta n$=0.0867.

We claim:

1. A liquid crystal composition comprising two or more compounds of general formula (1)

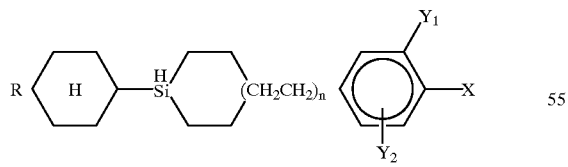

wherein

R is an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 carbon atoms;

n is 0 or 1;

steric configurations of both a silacyclohexane ring and a cyclohexane ring being in trans form;

X is H, F, Cl, $OCHF_2$, $OCF_3$, $CF_3$, $OC_kH_{2k+1}$ or $C_kH_{2k+1}$ {wherein k is an integer in the range of 1 to 5}, $(O)_sC_pH_qF_r$ {wherein s is 0 or 1, p is 2, 3 or 4, q and r are each 0 or a positive integer, and (q+r)=(2p+1)}, or $(O)_sCY=CX_1X_2$ {wherein s is 0 or 1, $X_1$ and Y are each H, F or Cl, and $X_2$ is F or Cl};

$Y_1$ and $Y_2$ each being H or F; and one or more compounds selected from compounds of general formulae (2) to (13)

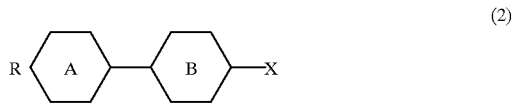

(2)

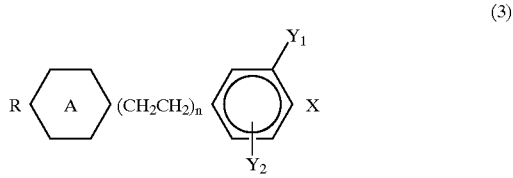

(3)

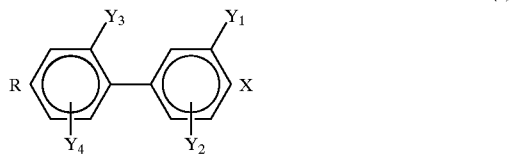

(4)

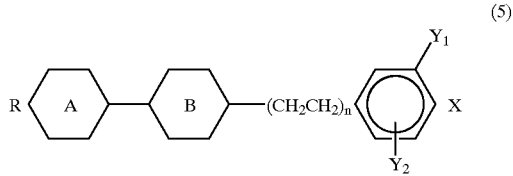

(5)

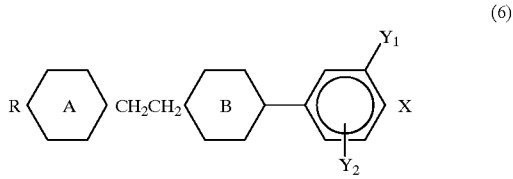

(6)

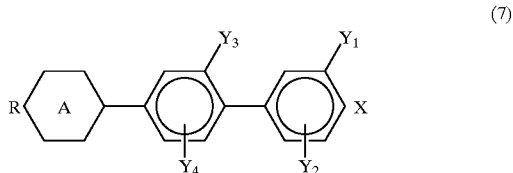

(7)

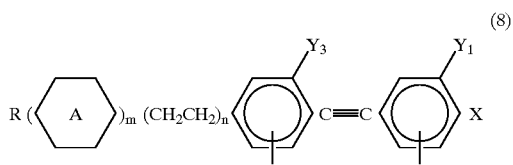

(8)

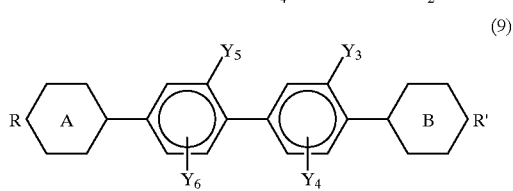

(9)

-continued

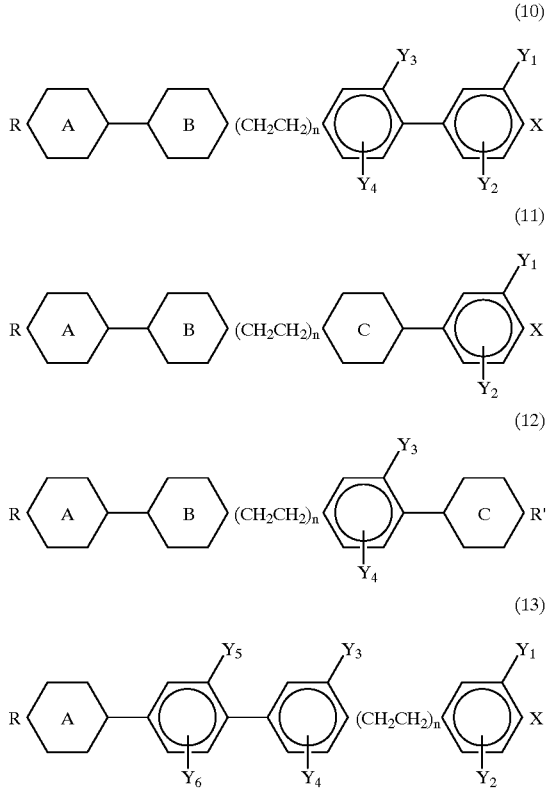

wherein
R and R' are each an alkyl group of 1 to 7 carbon atoms, an alkoxyalkyl group of 2 to 7 carbon atoms, a mono- or difluoroalkyl group of 2 to 7 carbon atoms, or an alkenyl group of 2 to 7 carbon atoms;
m is 0 or 1;
n is 0 or 1;

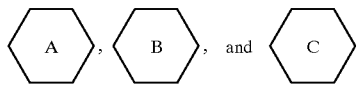

are each a trans-1-sila-1,4-cyclohexylene, trans-4-sila-1,4-cyclohexylene or trans-1,4-cyclohexylene group;
X is H, F, Cl, $OCHF_2$, $OCF_3$, $CF_3$, $OC_kH_{2k+1}$ or $C_kH_{2k+1}$ {wherein k is an integer in the range of 1 to 5}, $(O)_sC_pH_qF_r$ {wherein s is 0 or 1, p is 2, 3 or 4, q and r are each 0 or a positive integer, and (q+r)=(2p+1)}, or $(O)_sCY=CX_1X_2$ {wherein s is 0 or 1, $X_1$ and Y are each H, F or Cl, and $X_2$ is F or Cl};
$Y_1$, $Y_2$, $Y_3$, $Y_4$, $Y_5$ and $Y_6$ each being H or F.

2. A liquid crystal composition according to claim 1, wherein the one or more compounds are selected from compounds of general formulae (2), (3), (4), (5), (6), (7), (9) and (10).

3. A liquid crystal composition according to claim 1, wherein the one or more compounds are selected from compounds of the general formulae (2), (3), (5), (7) and (10).

4. A liquid crystal composition according to claim 1, wherein the one or more compounds are of general formula (3).

5. A liquid crystal composition according to claim 4 further comprising one or more compounds selected from compounds of general formulae (2), (4) to (13).

6. A liquid crystal composition according to claim 1 wherein the one or more compounds are of general formula (5).

7. A liquid crystal composition according to claim 6 further comprising one or more compounds of general formulae (2), (3), (4), and (6) to (13).

8. A liquid crystal composition according to claim 1, wherein the one or more compounds are of general formula (2).

9. A liquid crystal composition according to claim 1 wherein said two or more compounds of the general formula (1) are contained at a total amount of 10 mol % or higher in said composition.

10. A liquid crystal composition according to claim 2 wherein said two or more compounds of the general formula (1) are contained at a total amount of 10 mol % or higher in said composition.

11. A liquid crystal composition according to claim 3 wherein said two or more compounds of the general formula (1) are contained at a total amount of 10 mol % or higher in said composition.

12. A liquid crystal composition according to claim 4 wherein said two or more compounds of the general formula (1) are contained at a total amount of 10 mol % or higher in said composition.

13. A liquid crystal composition according to claim 5 wherein said two or more compounds of the general formula (1) are contained at a total amount of 10 mol % or higher in said composition.

14. A liquid crystal composition according to claim 6 wherein said two or more compounds of the general formula (1) are contained at a total amount of 10 mol % or higher in said composition.

15. A liquid crystal composition according to claim 7 wherein said two or more compounds of the general formula (1) are contained at a total amount of 10 mol % or higher in said composition.

16. A liquid crystal composition according to claim 8 wherein said two or more compounds of the general formula (1) are contained at a total amount of 10 mol % or higher in said composition.

17. A liquid crystal display element comprising said liquid crystal composition according to claim 1.

18. A liquid crystal display element comprising said liquid crystal composition according to claim 2.

19. A liquid crystal display element comprising said liquid crystal composition according to claim 3.

20. A liquid crystal display element comprising said liquid crystal composition according to claim 4.

21. A liquid crystal display element comprising said liquid crystal composition according to claim 5.

22. A liquid crystal display element comprising said liquid crystal composition according to claim 6.

23. A liquid crystal display element comprising said liquid crystal composition according to claim 7.

24. A liquid crystal display element comprising said liquid crystal composition according to claim 8.

* * * * *